(12) United States Patent
Song et al.

(10) Patent No.: US 11,467,734 B2
(45) Date of Patent: Oct. 11, 2022

(54) MANAGING SWAP AREA IN MEMORY USING MULTIPLE COMPRESSION ALGORITHMS

(71) Applicant: SAMSUNG ELECTRONICS CO., LTD., Suwon-si (KR)

(72) Inventors: Jusun Song, Suwon-si (KR); Jaehoon Jeong, Suwon-si (KR); Jihun Jung, Suwon-si (KR); Changhyeon Chae, Suwon-si (KR); Jaeook Kwon, Suwon-si (KR); Seokjae Jeong, Suwon-si (KR); Youngho Choi, Suwon-si (KR); Cheulhee Hahm, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/078,975

(22) Filed: Oct. 23, 2020

(65) Prior Publication Data
US 2021/0124496 A1    Apr. 29, 2021

(30) Foreign Application Priority Data
Oct. 25, 2019 (KR) .................. 10-2019-0134101

(51) Int. Cl.
*G06F 3/06* (2006.01)
(52) U.S. Cl.
CPC .......... *G06F 3/0608* (2013.01); *G06F 3/0604* (2013.01); *G06F 3/0629* (2013.01);
(Continued)
(58) Field of Classification Search
CPC .... G06F 3/0608; G06F 3/0604; G06F 3/0629; G06F 3/0653; G06F 3/0659;
(Continued)

(56) References Cited

U.S. PATENT DOCUMENTS 6,247,042 B1    6/2001 Engstrom et al.
9,740,631 B2    8/2017 Shiu
(Continued)

FOREIGN PATENT DOCUMENTS

KR    10-2015-0117180 A    10/2015
KR    10-1793963 B1    11/2017
(Continued)

OTHER PUBLICATIONS

Linux Kernel Chapter 10, Page Frame Reclamation, 2016. https://web.archive.org/web/20160416141940/https://www.kernel.org/doc/gorman/html/understand/understand013.html (Year: 2016).*

(Continued)

*Primary Examiner* — Arpan P. Savla
*Assistant Examiner* — Edmund H Kwong
(74) *Attorney, Agent, or Firm* — Sughrue Mion, PLLC

(57) ABSTRACT

A computing device and an operating method thereof are provided. The computing device includes a memory and a processor configured to: perform a first compression on a data object stored in the memory according to a first compression method, store the first compressed data object in a swap data storage area, and reclaim a portion of the memory in which the first compressed data object was stored; register information about the first compressed data object in a first management table; obtain the information about the first compressed data object from the first management table based on a usage ratio of the processor; and perform a second compression on the first compressed data object according to a second compression method, store the second compressed data object in the swap data storage area, and reclaim a portion of the swap data storage area in which the first compressed data object was stored.

18 Claims, 17 Drawing Sheets

(52) U.S. Cl.
CPC .......... *G06F 3/0653* (2013.01); *G06F 3/0659* (2013.01); *G06F 3/0673* (2013.01)

(58) Field of Classification Search
CPC ...... G06F 3/0673; G06F 9/5022; G06F 3/061; G06F 3/0638; G06F 2212/401
See application file for complete search history.

(56) References Cited

U.S. PATENT DOCUMENTS

| | | | |
|---|---|---|---|
| 10,146,693 B2 | 12/2018 | Verrilli et al. | |
| 2006/0069746 A1* | 3/2006 | Davis | H04L 67/2842 709/218 |
| 2007/0005911 A1* | 1/2007 | Yang | G06F 12/08 711/154 |
| 2011/0252184 A1* | 10/2011 | Cho | G06F 3/0608 711/102 |
| 2014/0075137 A1 | 3/2014 | Shin | |
| 2014/0173243 A1 | 6/2014 | Devendran et al. | |
| 2015/0242432 A1* | 8/2015 | Bak | G06F 12/08 707/693 |
| 2015/0301843 A1 | 10/2015 | Guo et al. | |
| 2015/0378612 A1* | 12/2015 | Bhat | G06F 3/0661 711/154 |
| 2017/0357454 A1* | 12/2017 | Kumar | H03M 7/46 |
| 2018/0101330 A1* | 4/2018 | Yoon | G06F 3/0608 |
| 2019/0004708 A1 | 1/2019 | Han et al. | |
| 2019/0095120 A1 | 3/2019 | Myrick et al. | |
| 2019/0370171 A1* | 12/2019 | Desai | G06F 12/0804 |
| 2020/0393968 A1* | 12/2020 | Kawase | H03M 7/30 |

FOREIGN PATENT DOCUMENTS

| | | |
|---|---|---|
| KR | 10-2018-0129799 A | 12/2018 |
| WO | 2017/026740 A1 | 2/2017 |

OTHER PUBLICATIONS

Sumesh et al., "Knowing your Virtual platform for optimal performance", MaxSpace, Apr. 16, 2015, URL: https://maxsumesh.wordpress.com/2015/04/16/knowing-your-virtual-platform-for-optimal-performance>, Six pages.

International Search Report (PCT/ISA/210) and Written Opinion (PCT/ISA/237) dated Jan. 29, 2021 issued by the International Searching Authority in International Application No. PCT/KR2020/014609.

Magenheimer, Dan, "In-kernel memory compression", LWN.net, Apr. 3, 2016, XP055778404, URL: https://web.archive.org/web/20160304065618/https://lwn.net/Articles/545244, Apr. 3, 2013, 18 pages.

Rdiez, "Linux zram", Rdiez's Personal Wiki, May 15, 2015, XP055778416, URL: http://rdiez.shoutwiki.com/w.index.php?title=Linux_zram&oldid=74, May 15, 2015, 6 pages.

Paavo-Einari, "Virtual Memory Compression", SummerOfCode2019Projects/VirtualMemoryCompression-FreeBSD Wiki, May 6, 2019, XP055778429, URL: https://wiki.freebsd.org/SummerOfCode2019Projects/VirtualMemoryCompression, Retrieved on Feb. 22, 2021, 3 pages.

Communication dated Mar. 3, 2021 by the European Patent Office in corresponding European Application No. 20203557.2.

* cited by examiner

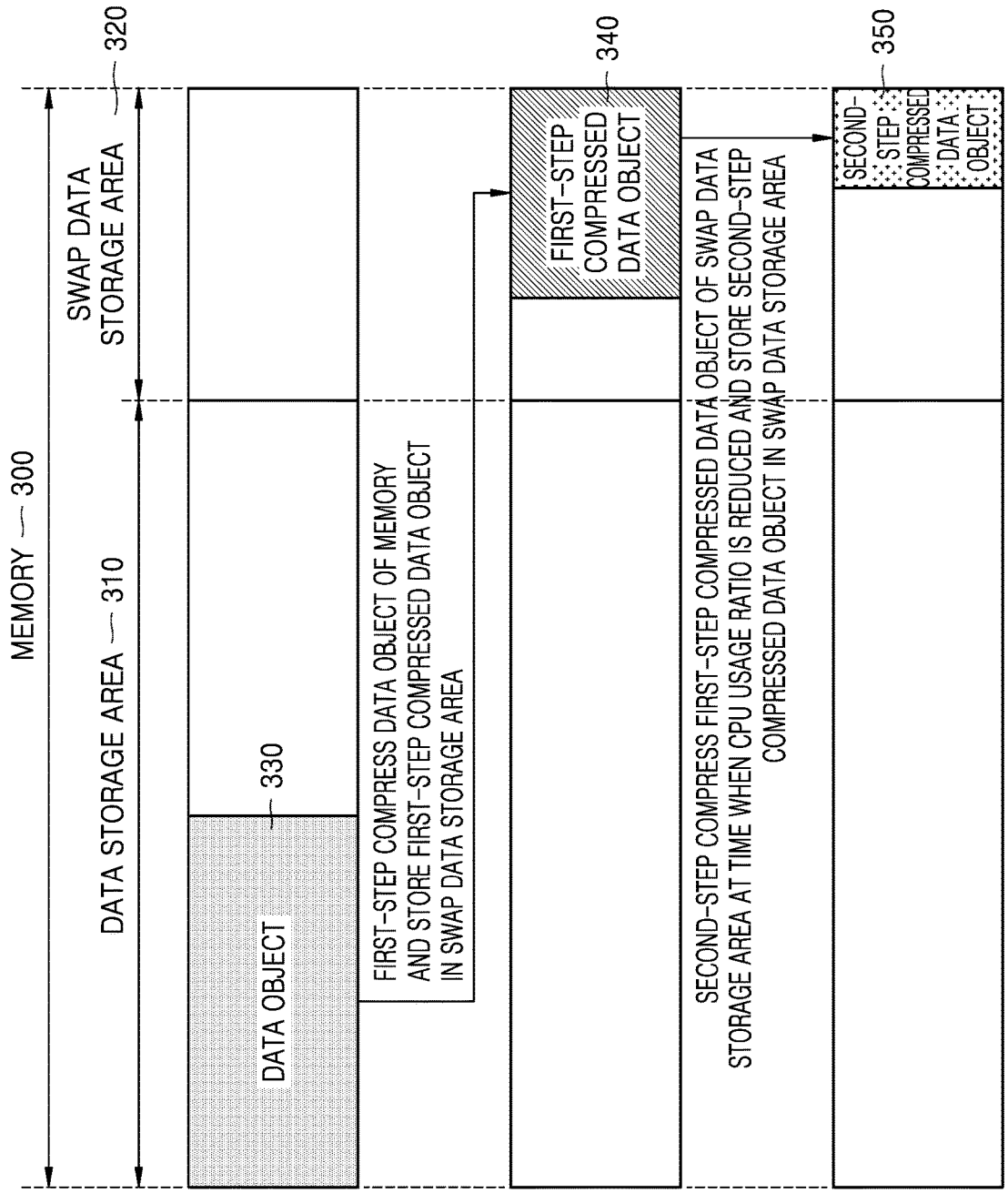

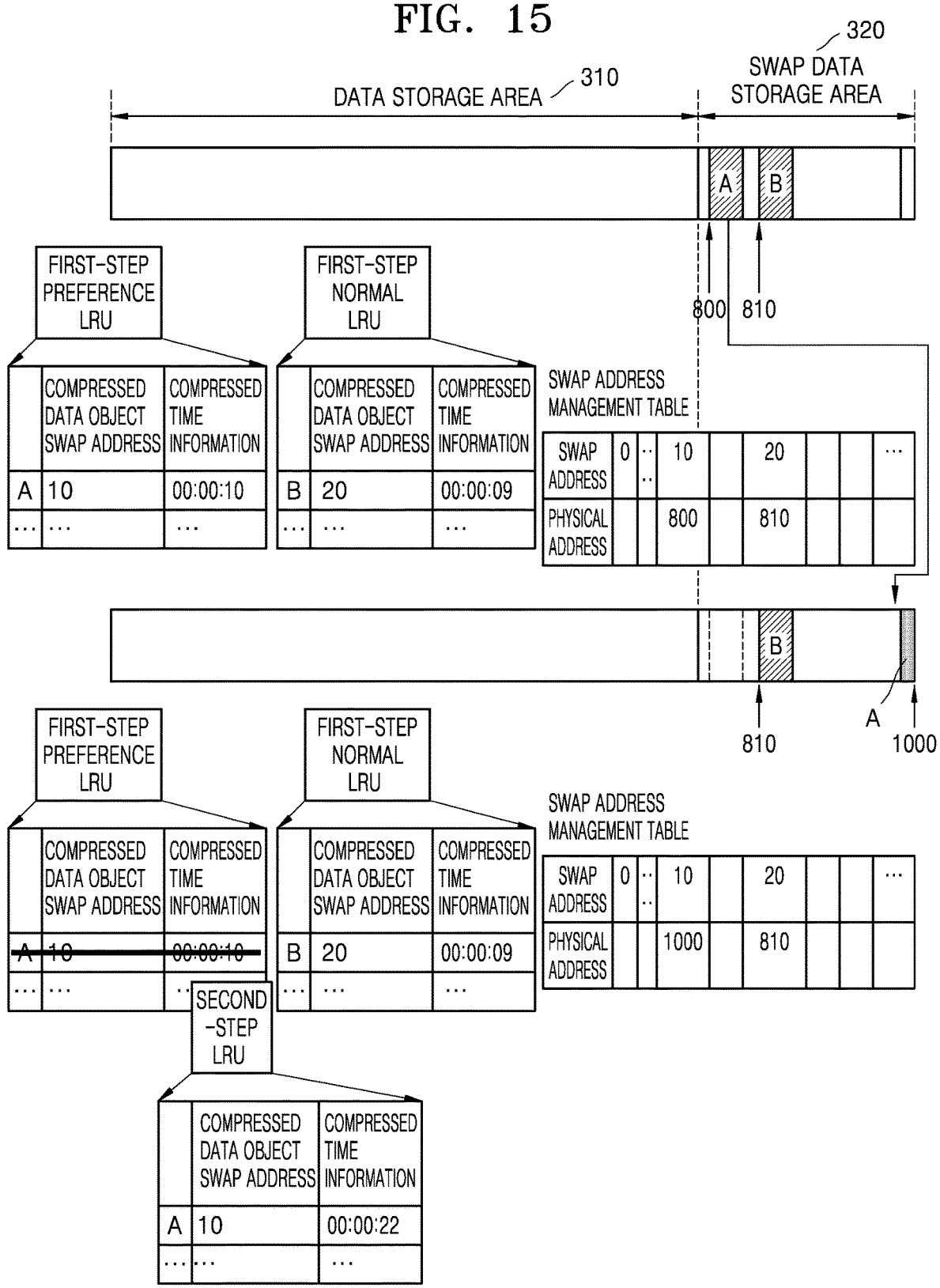

MANAGING SWAP AREA IN MEMORY USING MULTIPLE COMPRESSION ALGORITHMS

CROSS-REFERENCE TO RELATED APPLICATION

This application is based on and claims priority under 35 U.S.C. § 119 to Korean Patent Application No. 10-2019-0134101, filed on Oct. 25, 2019, in the Korean Intellectual Property Office, the disclosure of which is incorporated by reference herein in its entirety.

BACKGROUND

1. Field

The disclosure relates to a computing device and an operating method thereof, and more particularly, to a computing device for performing a memory reclamation function and an operating method of the computing device.

2. Description of Related Art

A computing device loads various applications by using a main memory and performs an operation corresponding to an application by executing an application process. In this case, when a vast amount of data is loaded in the main memory, the performance of the computing device decreases. Accordingly, the computing device periodically monitors a memory usage and performs a memory reclamation operation (swap-out/swap-in) when the memory usage exceeds a certain level. During the memory reclamation operation, data stored in a memory is compressed and stored again in another storage device or a portion of the memory. When a compression ratio increases during data compression, a compression speed decreases and a compression time increases, thereby degrading the performance of the computing device. Accordingly, in general, a computing device performs compression by using a compression method having a high compression speed rather than a compression method having a high compression ratio, in order to prevent the degradation of the computing performance during memory reclamation. Accordingly, a more efficient method of performing memory reclamation to make more memory space available is required to yield a high compression ratio while maintaining the high compression speed.

SUMMARY

Provided are a computing device and an operating method thereof, which may overcome limitations of a memory reclamation function according to the related art using only a compression algorithm having a low compression ratio and a high speed due to swap-out/swap-in performance, and may maintain existing swap-out/swap performance and increase a data compression ratio by maintaining a compression algorithm according to the related art having a high speed and recompressing the compressed data stored in a swap device by using a compression algorithm having a high compression ratio when a central processing unit (CPU) is idle.

Additional aspects will be set forth in part in the description which follows and, in part, will be apparent from the description, or may be learned by practice of the presented embodiments.

According to an embodiment, there is provided a computing device including: a memory storing one or more instructions; and a processor configured to execute the one or more instructions stored in the memory to: perform a first compression on a data object stored in the memory according to a first compression method based on a free space of the memory, store the first compressed data object in a swap data storage area, and reclaim a portion of the memory in which the first compressed data object was stored; register information about the first compressed data object stored in the swap data storage area, in a first management table; obtain the information about the first compressed data object from the first management table based on a usage ratio of the processor; and perform a second compression on the first compressed data object according to a second compression method, store the second compressed data object in the swap data storage area, and reclaim a portion of the swap data storage area in which the first compressed data object was stored.

The information about the first compressed data object registered in the first management table includes a first storage time indicating a time when the first compressed data object is stored in the swap data storage area, and the processor is further configured to execute the one or more instructions to determine whether the first storage time of the first compressed data object exceeds a threshold time.

The processor is further configured to execute the one or more instructions to register the first storage time of the first compressed data in the first management table based on a size of the first compressed data object being greater than a minimum threshold value and less than a maximum threshold value.

The processor is further configured to execute the one or more instructions to obtain the information about the first compressed data object of which the first storage time exceeds the threshold time from the first management table, in response to the usage ratio of the processor being less than a first threshold value and a usage of the memory exceeding a second threshold value.

The swap data storage area is a portion of the memory.

The second compression method has a compression ratio different from a compression ratio of the first compression method.

The processor is further configured to execute the one or more instructions to register a second storage time indicating a time when the second compressed data object is stored in the swap data storage area, in a second management table.

The processor is further configured to execute the one or more instructions to: obtain the second compressed data object of which the second storage time exceeds a threshold time, and perform a third compression on the second compressed data object according to a third compression method, store the third compressed data object in the swap data storage area, and reclaim a portion of the swap data storage area in which the second compressed data object was stored.

The first management table includes a first preference table and a first normal table, and the processor is further configured to execute the one or more instructions to: register the first compressed data object in the first preference table based on a process corresponding to the first compressed data object stored in the swap data storage area being a non-killable process, and register the first compressed data object in the first normal table based on a process corresponding to the first compressed data object stored in the swap data storage area being a killable process.

The processor is further configured to execute the one or more instructions to preferentially select the first compressed data object registered in the first preference table over the first compressed data object registered in the first normal table, as a second compression target data object in response to the usage ratio of the processor being less than a first threshold value.

According to an embodiment, there is provided an operating method of a computing device, the operating method including: performing a first compression on a data object stored in a memory according to a first compression method, storing the first compressed data object in a swap data storage area based on a free space of the memory, and reclaiming a portion of the memory in which the first compressed data object was stored; registering information about the first compressed data object stored in the swap data storage area, in a first management table; obtaining the information about the first compressed data object from the first management table based on a usage ratio of a processor; and performing a second compression on the first compressed data object according to a second compression method, storing the second compressed data object in the swap data storage area, and reclaiming a portion of the swap data storage area in which the first compressed data object was stored.

The information about the first compressed data object registered in the first management table includes a first storage time indicating a time when the first compressed data object is stored in the swap data storage area, and the operating method further includes determining whether the first storage time of the first compressed data object exceeds a threshold time.

The operating method further includes registering the first storage time of the first compressed data object in the first management table based on a size of the first compressed data object being greater than a minimum threshold value and less than a maximum threshold value.

The operating method further includes obtaining the information about the first compressed data object of which the first storage time exceeds the threshold time from the first management table, in response to the usage ratio of the processor being less than a first threshold value and a usage of the memory exceeding a second threshold value.

The second compression method has a compression ratio different from a compression ratio of the first compression method, and the compression ratio of the second compression method is higher than the compression ratio of the first compression method.

The operating method further includes registering a second storage time indicating a time when the second compressed data object is stored in the swap data storage area, in a second management table.

The operating method further includes: obtaining the second compressed data object of which the second storage time exceeds a threshold time, and performing a third compression on the second compressed data object according to a third compression method, storing the third compressed data object in the swap data storage area, and reclaiming a portion of the swap data storage area in which the second compressed data object was stored.

The first management table includes a first preference table and a first normal table, the operating method further includes: registering the first compressed data object in the first preference table based on a process corresponding to the first compressed data object stored in the swap data storage area being a non-killable process, and registering the first compressed data object in the first normal table based on a process corresponding to the first compressed data object stored in the swap data storage area being a killable process.

The operating method further includes preferentially selecting the first compressed data object registered in the first preference table over the first compressed data object registered in the first normal table, as a second compression target data object in response to the usage ratio of the processor being less than a first threshold value.

According to an embodiment, there is provided a non-transitory computer-readable recording medium having recorded thereon a computer program for executing an operating method of a computing device, the operating method includes: performing a first compression on a data object stored in a memory according to a first compression method, storing the first compressed data object in a swap data storage area based on a free space of the memory, and reclaiming a portion of the memory in which the first compressed data object was stored; registering information about the first compressed data object stored in the swap data storage area, in a first management table; obtaining the information about at least one first compressed data object from the first management table based on a usage ratio of a processor; and performing a second compression on the at least one first compressed data object according to a second compression method, storing the second compressed data object in the swap data storage area, and reclaiming a portion of the swap data storage area in which the first compressed data object was stored.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 3 is a reference diagram for describing a concept of a memory reclamation method in a computing device according to an embodiment;

FIG. 15 is a reference diagram for describing an example of preparing first-step preference LRU by using characteristics of data and performing second-step compression according to an embodiment.

DETAILED DESCRIPTION

Figure 1:
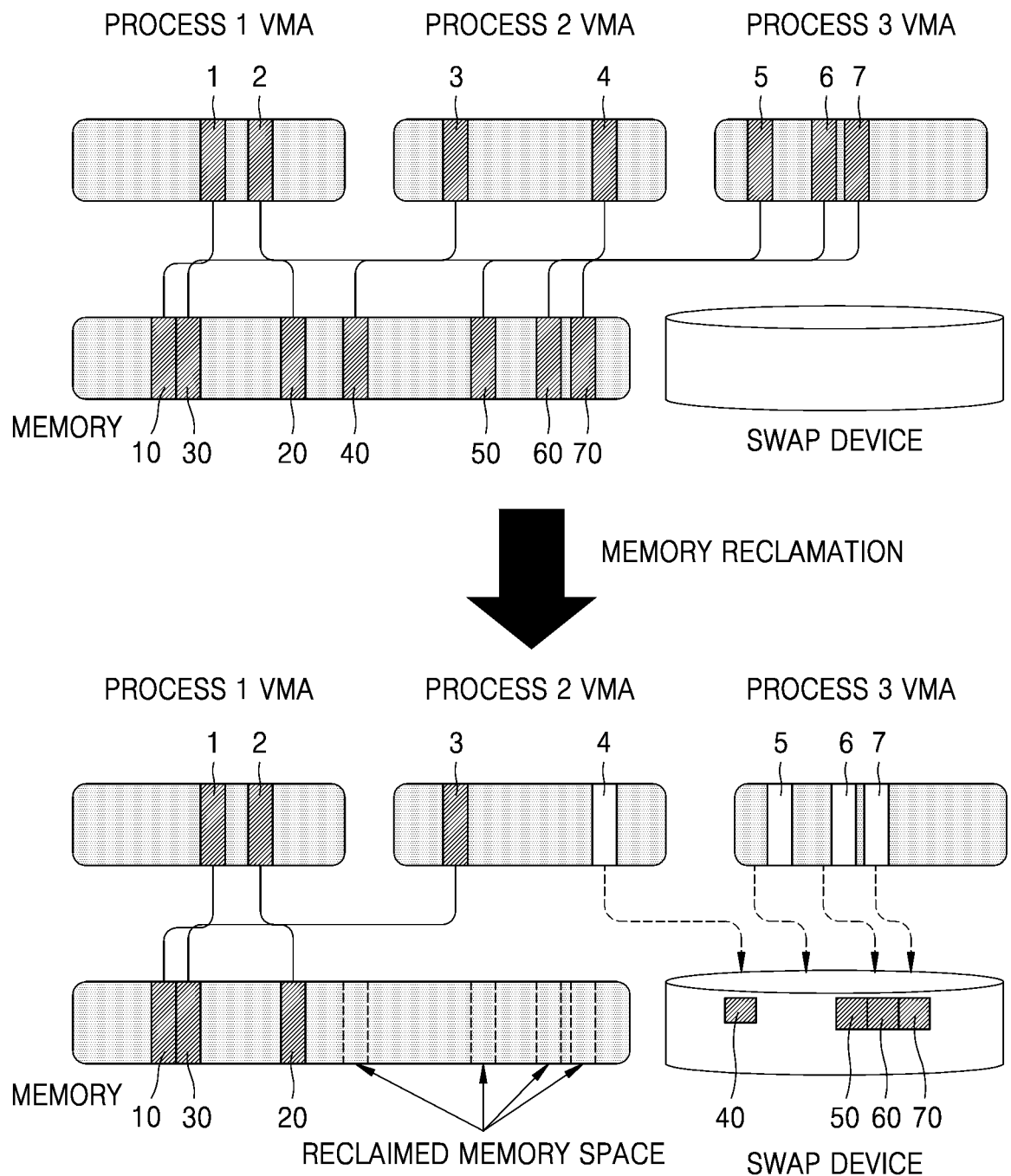
FIG. 1 is a reference diagram for describing a memory reclamation concept according to an embodiment.

The terms used herein will be briefly described, and embodiments of the disclosure will be described in detail.

The terms used herein are general terms currently widely used in the art in consideration of functions in the disclosure, but the terms may vary according to the intention of one of ordinary skill in the art, precedents, or new technology in the art. Also, some of the terms used herein may be arbitrarily chosen by the applicant, and in this case, these terms are defined in detail below. Accordingly, the specific terms used herein should be defined based on the unique meanings thereof and the context of the disclosure.

It will be understood that when a certain part "includes" a certain component, the part does not exclude another component but may further include another component, unless the context clearly indicates otherwise. The term used herein such as "unit" or "module" indicates a unit for processing at least one function or operation, and may be implemented in hardware, software, or in a combination of hardware and software.

The expression "at least one of a, b or c" indicates only a, only b, only c, both a and b, both a and c, both b and c, all of a, b, and c, or variations thereof.

The disclosure will now be described in more detail with reference to the accompanying drawings for one of ordinary skill in the art to be able to make and use the embodiments of the disclosure. The disclosure may be embodied in many different forms and should not be construed as being limited to the embodiments of the disclosure set forth herein. In the drawings, portions irrelevant the descriptions of the disclosure may not be illustrated for clarity of explanation, and like reference numerals denote like elements throughout.

The term "user" used herein refers to a person who controls a function or operation of a computing device, and may include, for example, a viewer, a manager, or an installation engineer.

FIG. 1 is a reference diagram for describing a memory reclamation concept according to an embodiment.

Memory reclamation refers to a process of returning a space of a memory that is used by a process (e.g., an application or a daemon) operating in a system to the system so that the system reuses the returned space of the memory. The memory reclamation may be performed by breaking a connection between a virtual address and a physical address, while maintaining the virtual address of the application. Data of a physical memory of which the connection to the virtual address is broken is copied to another storage device, and then the physical memory is used for another purpose. When the process attempts to access the reclaimed virtual address, a new physical memory is allocated, data of the storage device is copied, and a reconnection to the virtual address is established.

Memory reclamation is performed by using two methods according to a memory type.

First, because file-type memory data (e.g., code or a general file) may be read again from a storage device, a memory is reclaimed by dropping the data and breaking a connection between a virtual address and a physical memory address.

Second, because anonymous (Anon)-type memory data (e.g., a data area, a heap for dynamic allocation, or a stack) may not be read again, a memory is reclaimed by storing data in a swap device and breaking a connection between a virtual address and a physical memory.

In the disclosure, reclamation performed by swapping out Anon-type memory data will be described.

A memory reclamation concept will be described with reference to an example shown in FIG. 1.

Referring to FIG. 1, three processes, that is, a process 1, a process 2, and a process 3, operate in a system. Each process has a virtual machine address (VMA) system for finding a memory space that is used by each process. A central processing unit (CPU) allows a process to operate based on a virtual address by using a memory management unit (MMU), the virtual address used by each process is connected to a physical memory, and when the process accesses (reads/writes/executes) the virtual address, the process accesses the physical memory connected through the MMU.

The process 1 accesses a memory space through a process 1 VMA, and the process 2 accesses a memory space through a process 2 VMA. For convenience of description, it is assumed that data of a memory corresponding to a virtual address <1> of the process 1 is <10>, data of a memory corresponding to a virtual address <2> of the process 1 is <20>, data of a memory corresponding to a virtual address <3> of the process 2 is <30>, data of a memory corresponding to a virtual address <4> of the process 2 is <40>, data of a memory corresponding to a virtual address <5> of the process 3 is <50>, data of a memory corresponding to a virtual address <6> of the process 3 is <60>, and data of a memory corresponding to a virtual address <7> of the process 3 is <70>. Although a virtual address and an actual memory are simply mapped to each other in FIG. 1 for convenience of description, a virtual address actually accessed by a CPU may be translated by using one or more page tables and offsets, to obtain a final physical address. When a process accesses a memory based on a virtual address, a CPU translates the virtual address into a physical address at a high speed by referring to page table information of an MMU. Connection information between a virtual address and a physical address is included in a page table. A process may access a physical memory by using the page table. A page is a basic unit for physical memory management, and a physical memory is generally managed in 4 KB pages.

When a memory space is being used and a physical memory becomes scarce in a system, a kernel swap daemon (kswapd) may operate to reclaim a memory of a process and start securing free spaces in the memory.

A space for copying data of the physical memory in a memory reclamation process is referred to as a swap device. A storage device such as a hard disk drive (HDD) is often used as a swap device in an environment of a server and a personal computer (PC). However, in an embedded system (e.g., a smartTV or a smartphone), an HDD storage device is rarely used, and a flash storage device that is mainly used has a short lifespan due to a memory swap operation. Accordingly, in an embedded system, a RAM-disk (or RAM-drive) that compresses data of a physical memory and stores the data in a kernel memory, rather than a general storage device, is used. Although a RAM-disk-based swap device is illustrated in the disclosure, embodiments of the disclosure are not limited to the RAM-disk-based swap device.

Referring to FIG. 1, memory spaces corresponding to the virtual addresses 4, 5, 6, and 7 are reclaimed, and data at the virtual addresses 4, 5, 6, and 7 are compressed and stored in a swap device. A process of compressing data and storing the compressed data in a swap device is referred to as swap-out, and a process of decompressing compressed data from a swap device and storing the decompressed data in a memory is referred to as swap-in. When the memory spaces corresponding to the virtual addresses 4, 5, 6, and 7 are reclaimed, a system may regain memory spaces occupied by the data 40, 50, 60, and 70 and may use the memory spaces to store other data.

Figure 2:
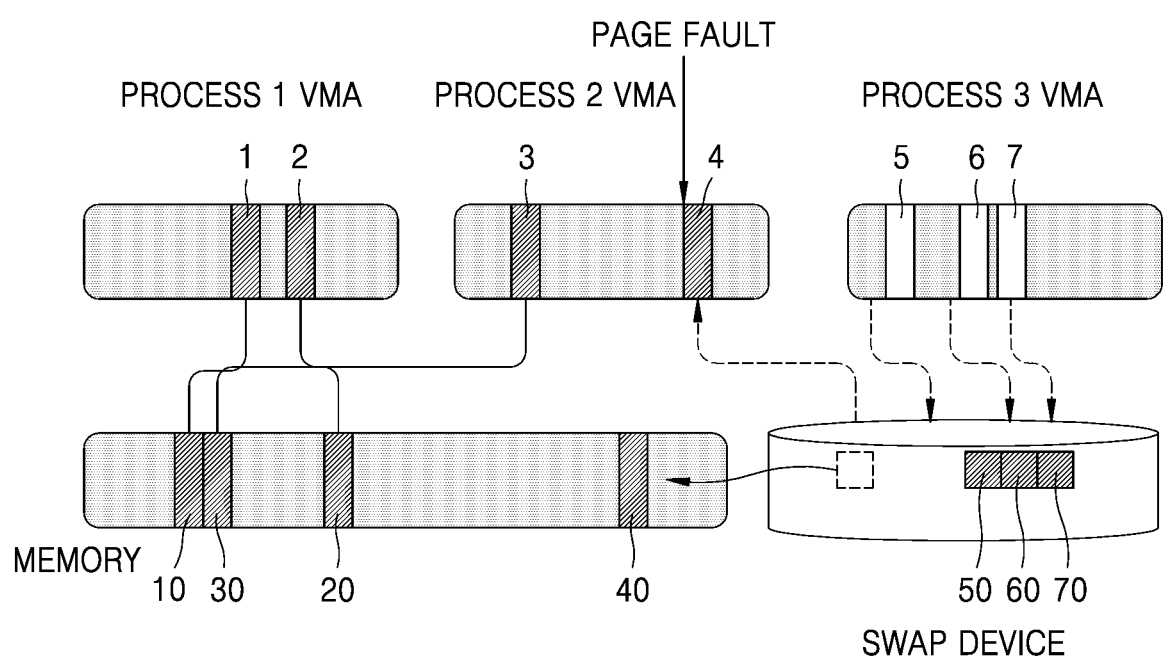
FIG. 2 is a reference diagram for describing an operation according to a page fault according to an embodiment.

FIG. 2 is a reference diagram for describing an operation according to a page fault according to an embodiment.

When a process accesses a virtual address and there is no information about a physical address connected to the virtual address in a page table, an MMU raises a hardware (HW) exception referred to as a page fault. During memory reclamation, because data of a physical memory is stored in a RAM-disk-based swap device and a connection between a virtual address and a physical address is broken, a page fault occurs when a process accesses the virtual address. Once the page fault occurs, an operating system allocates a new physical memory, reads data from the swap device and copies the data to the new physical memory. When the data is completely copied to the new physical memory, the new physical memory is connected to a virtual memory so that the process can access the data.

Referring to FIG. 2, when a CPU attempts to access the virtual address <4> of the process 2 that is a reclaimed virtual address, a page fault occurs. In this case, an operating system allocates a new physical address, and reads the data <40> corresponding to the virtual address <4> and copies the data <40> to the new physical address.

As such, when an available space of a system memory is reduced such that the available space is less than or equal to a set threshold value while the system and a process operate, a kernel swap daemon kswapd of the operating system wakes up and starts memory reclamation. The memory reclamation involves breaking a virtual/physical address connection in mapping information (e.g., a page table) between virtual and physical memories, compressing memory data by using a compression algorithm set in the system, and storing the compressed data in a swap device. When the process accesses (reads/writes) a virtual address of a compressed area, a page fault occurs. In this case, swap-in is performed, by decompressing the compressed data stored in the swap device and loading the decompressed data to a memory so that the process accesses the virtual address.

Conventionally, because a memory reclamation method prioritizes response speed performance during application launching to secure memory space, data stored in the memory may be compressed by using an algorithm/level having a high compression speed from among various compression algorithms and a plurality of levels of the compression algorithms. That is, a conventional compression method/level has a low compression ratio, and a short compression time.

However, when an algorithm having a high compression ratio is used for memory reclamation, a compression time is relatively longer compared to that of an algorithm having a lower compression ratio and swap-out/swap-in performance is degraded, and thus access of an application to a desired memory may be delayed and considerable performance degradation may occur. Accordingly, a memory reclamation method according to the related art does not use a compression algorithm having a high compression ratio, but instead uses a compression algorithm having a low compression ratio to yield a high compression speed. For example, a default compression algorithm of a Linux-based operating system is lz4. A default compression level 1 is used, and as a compression level increases, a compression ratio increases. Although various compression algorithms and compression levels other than lz4 may be used, an operating system according to the related art selectively provides only an algorithm such as Lempel-Ziv 4 (LZ4 or lz4), Lempel-Ziv-Oberhumer (LZO or Lzo), or zstandard (zstd), and it is impossible for the operating system to dynamically adjust a compression algorithm and level.

Embodiments of the disclosure provide a memory reclamation method that improves compression performance and compression ratio based on the following two schemes.

First, in the case of a plurality of compression algorithms (e.g., lz4, zstd, and Lempel-Ziv-Markov (lzma)), as a compression level increases, compression speed performance (swap-out) decreases but decompression speed performance (swap-in) is constant. However, because a compression ratio may increase as a compression level increases, a compression ratio may be improved by performing secondary compression by using a compression method having a high compression ratio during a time when a usage of a CPU is low.

Second, among reclaimed memories of an application, there are many memories that are not accessed or are very rarely accessed (swapped-in) until the system is turned off. Also, there are many cases in which a memory is not loaded when a specific operation scenario does not trigger the memory to be loaded. Accordingly, during the secondary compression using the compression method having the high compression ratio during the time when the usage of the CPU is low, compression efficiency may be further improved by appropriately selecting memory data to be subjected to the secondary compression.

FIG. 3 is a reference diagram for describing a concept of a memory reclamation method in a computing device according to an embodiment.

Referring to FIG. 3, a memory 300 may include a data storage area 310 and a swap data storage area 320. A computing device may read a data object 330 stored in the data storage area 310 based on a free space of the memory 300. Specifically, in a first compression, e.g., first-step compression, the computing device compresses the read data object 330 by using a first compression method to obtain a first compressed data object, e.g., a first-step compressed data object 340, and stores the first-step compressed data object 340 in the swap data storage area 320 to reclaim a memory space in which the data object 330 was stored. For example, the computing device may reclaim a memory space when a usage of the memory 300 exceeds a threshold value and/or a free space of the memory 300 is less than a free space threshold value.

Although the first compression method used in first-step compression may be determined in various ways according to an embodiment, a compression method having a high compression speed may be used considering compression speed performance rather than a compression ratio.

Although the swap data storage area 320 is illustrated as a portion of the memory 300 in FIG. 3, the swap device storage area 320 may be an external device that is separated from the memory 300.

The computing device may read the first-step compressed data object 340 stored in the swap data storage area 320 based on a usage ratio of a processor, perform a second compression, e.g., a second-step compression, on the first-step compressed data object 340 by using a second compression method to obtain a second compressed data object, e.g., a second-step compressed data object 350. Then, the second-step compressed data object 350 may be stored in the swap data storage area 320. Specifically, the computing device decompresses the first-step compressed data object 340 stored in the swap data storage area 320, and then performs the second-step compression by using the second compression method. For example, the computing device may start the second-step compression when it is detected that the usage ratio of the processer is less than a threshold value. This is to additionally secure a free space of the memory 300 by performing additional compression, that is, the second-step compression, during a time when the processor is not busy, without burdening an operation of the processor.

According to an embodiment, a method having lower compression speed performance than the first compression method but having a high compression ratio may be used as the second compression method.

As such, when a usage of the memory 300 increases, because a data object is first-step compressed by using a first compression method having high compression speed performance, a memory space may be secured at a high response speed; and when a usage ratio of a CPU decreases, because the first-step compressed data object is second-step compressed by using a second compression method having a relatively higher compression ratio, more memory space may be secured.

A computing device for performing memory reclamation will be described with reference to FIGS. 4A, 4B, and 4C.

Figure 4A:
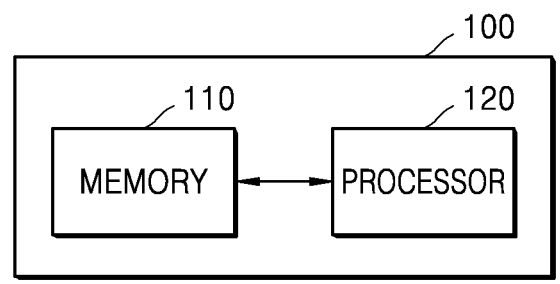
FIG. 4A is a block diagram of a computing device for performing memory reclamation according to an embodiment.

FIG. 4A is a block diagram of a computing device for performing memory reclamation according to an embodiment.

Referring to FIG. 4A, a computing device 100 may include a memory 110 and a processor 120.

The memory 110 according to an embodiment may store programs for one or more processes and control operations of the processor 120, and store data input to or output from the computing device 100.

The memory 110 may include at least one type of storage medium from among a flash memory type, a hard disk type, a multimedia card micro type, a card type memory (e.g., a secure digital (SD) or extreme digital (XD) memory), random-access memory (RAM), static random-access memory (SRAM), read-only memory (ROM), electrically erasable programmable read-only memory (EEPROM), programmable read-only memory (PROM), a magnetic memory, a magnetic disk, or an optical disk.

The processor 120 controls overall operations of the computing device 100. For example, the processor 120 may perform a function of the computing device 100, by executing one or more instructions stored in the memory 110.

The processor 120 according to an embodiment executes the one or more instructions stored in the memory 110, to first-step compress a data object stored in the memory 110 according to a first compression method and store the first-step compressed data object in a swap data storage area based on a usage of the memory 110, reclaim a portion of the memory 110 in which the data object was stored, and register storage time information of the first-step compressed data object stored in the swap data storage area in a first management table. The processor 120 may also obtain the first-step compressed data object of which the storage time exceeds a threshold time from the first management table based on a usage ratio of the processor 120, second-step compress the first-step compressed data object according to a second compression method, store the second-step compressed data object in the swap data storage area, and reclaim a portion of the swap data storage area in which the first-step compressed data object was stored.

As such, because the second-step compression is performed during a time when a usage ratio of the processor 120 is relatively low in addition to first-step compression, a memory space may be additionally secured without degrading the performance of the computing device 100.

The processor 120 may execute the one or more instructions stored in the memory 110 to register the storage time information of the first-step compressed data object in the first management table based on a size of the first-step compressed data object being greater than a minimum threshold value and/or less than a maximum threshold value.

As such, when the first-step compressed data object satisfying a certain threshold value is registered in the first management table, the second-step compression may be performed according to the registered first-step compressed data objects in the first management table. In addition, the first-step compressed data object that no longer requires further compression may not be registered in the first management table, and therefore, a data object to be second-step compressed may be effectively selected.

The processor 120 may execute the one or more instructions stored in the memory 110, to obtain information about the first-step compressed data object of which the storage time exceeds a threshold time, from the first management table, in response to a case where a usage ratio of the processor 120 is less than a threshold value and a usage of the memory 110 exceeds a threshold value.

According to an embodiment, the swap data storage area may be a portion of the memory 110.

According to an embodiment, the swap data storage area may be separated from the memory 110.

According to an embodiment, a compression ratio of the second compression method may be different from (e.g., higher than) a compression ratio of the first compression method.

The processor 120 may execute the one or more instructions stored in the memory 110 to register storage time information indicating a storage time of the second-step compressed data object stored in the swap data storage area in a second management table.

As such, because the second-step compressed data object satisfying a certain threshold value is separately registered in the second management table, a data object to be third compressed, e.g., third-step compressed, may be effectively selected.

The processor 120 may execute the one or more instructions stored in the memory 110 to obtain the second-step compressed data object of which the storage time exceeds a threshold time from the second management table, perform third compression, e.g., third-step compression, on the second-step compressed data object according to a third compression method, store the third compressed data object, e.g., the third-step compressed data object, in the swap data storage area, and reclaim a portion of the swap data storage area in which the second-step compressed data object was stored.

In addition, the processor 120 may execute the one or more instructions stored in the memory 110 to register the first-step compressed data object in a first preference table when a process corresponding to the first-step compressed data object stored in the swap data storage area is a non-killable process, and register the first-step compressed data object in a first normal table when a process corresponding to the first-step compressed data object stored in the swap data storage area is a killable process.

Furthermore, the processor 120 may execute the one or more instructions stored in the memory 110 to preferentially select the first-step compressed data object registered in the first preference table over the first-step compressed data object registered in the first normal table when a second compression target data object is selected in response to a case where a usage ratio of the processor 120 is less than a threshold value.

The computing device 100 may include more elements than those illustrated in FIG. 4A, and the disclosure is not limited to the above example.

According to an embodiment, the computing device 100 may further include one or more of a display for displaying an image on a screen under the control of the processor 120, a tuner for receiving a broadcast signal, a communicator capable of communicating with an external device by using a wired/wireless communication system, a detector for detecting a user's voice, image, interaction, etc., an input/output unit for transmitting/receiving a video, audio, or additional information input from the outside of the computing device 100, a video processor for processing image data displayed on a display, an audio processor, an audio output unit, and a user input unit through which the user inputs data for controlling the computing device 100, in addition to the memory 110 and the processor 120.

Figure 4B:
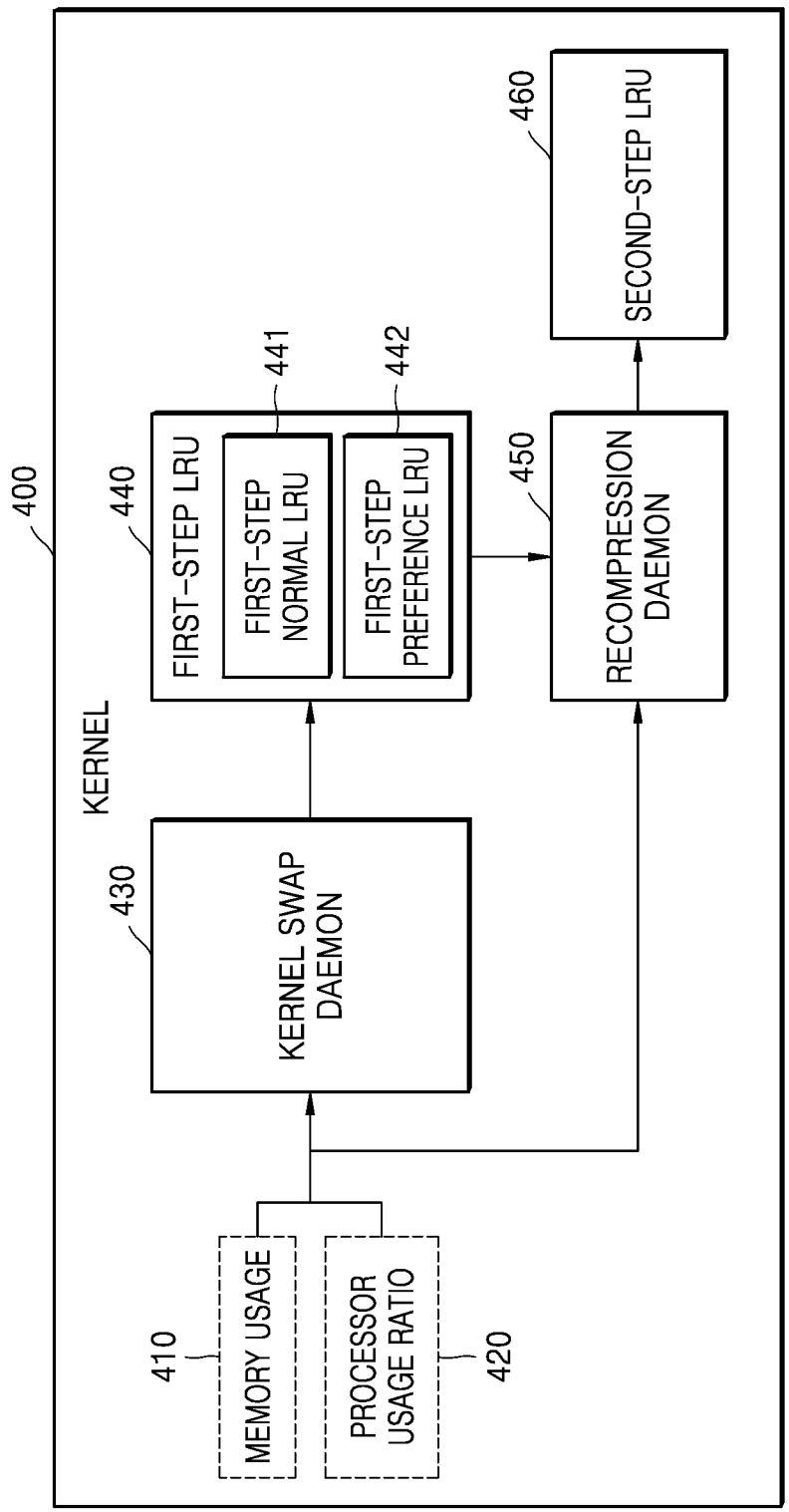
FIG. 4B is a reference diagram for describing an operation of a processor of a computing device that performs memory reclamation according to an embodiment.

FIG. 4B is a reference diagram for functionally describing an operation of a processor of a computing device for performing memory reclamation according to an embodiment.

Referring to FIG. 4B, a kernel 400 may include a kernel swap daemon 430, a first-step least recently used (LRU) 440, a recompression daemon 450, and a second-step LRU 460.

A kernel is a computer program at the core of an operating system of a computer with complete control over everything in a system, and provides various services necessary to operate other portions of the operating system and an application program. The kernel plays the role of securing computer hardware and processes, managing resources for efficiently utilizing limited system resources and smoothly executing programs, and performing abstraction.

A daemon is a program that performs various tasks in the background without being under the direct control of a user in a multitasking operating system, and responds to network requests, hardware activity, and other programs.

Referring to FIG. 4B, a memory reclamation function may be performed by the kernel swap daemon 430 and the recompression daemon 450.

The kernel swap daemon 430 operates based on a memory usage 410. For example, when the memory usage 410 exceeds a threshold value, first-step compression may be performed on a data object of a memory, and the first-step compressed data object may be stored in a swap data storage area. Also, the kernel swap daemon 430 may register, in the first-step LRU 440, information about a first-step compressed data object satisfying a pre-determined threshold condition from among first-step compressed data objects to select the first compressed data object to be second-step compressed.

According to an embodiment, the kernel swap daemon 430 may register, in the first-step LRU 440, a first-step compressed data object satisfying a pre-determined threshold condition based on a compression size being greater than a minimum threshold value and/or less than a maximum threshold value.

According to an embodiment, the kernel swap daemon 430 may selectively register a first-step compressed data object in a first-step normal LRU 441 and a first-step preference LRU 442 of the first-step LRU 440 based on characteristics of a data object. The characteristics of the data object may include whether the data object is killable or non-killable. When a data object is non-killable, it means that a process corresponding to the data object is an indispensable critical process to an operation of a system, and thus must not be removed from the system. When a data object is killable, it means that the data object may be removed from a system. For example, when a first-step compressed data object is killable, the kernel swap daemon 430 may register the first-step compressed data object in the first-step normal LRU 441. For example, when a first-step compressed data object is non-killable, the kernel swap daemon 430 may register the first-step compressed data object in the first-step preference LRU 442. A priority for a second-step compression target varies according to whether data objects are registered in the first-step normal LRU 441 or the first-step preference LRU 442. As such, when a non-killable data object is registered in the first-step preference LRU 442, a data object registered in the first-step preference LRU442 is preferentially selected as a second-step compression target over a data object registered in the first-step normal LRU 441. Because a non-killable data object must not be removed from a system, it may be prioritized as a potential a second-step compression target over a killable data object registered in the first-step normal LRU 441.

The recompression daemon 450 may operate based on the memory usage 410 and a processor usage ratio 420. For example, the recompression daemon 450 may begin to operate when the processor usage ratio 420 is less than a threshold value and the memory usage 410 is equal to or greater than a threshold value. Also, the recompression daemon 450 reads a data object exceeding a threshold time from the swap data storage area from among first-step compressed data objects registered in the first-step LRU to decompress the first-step compressed data object and performs compression by using a second-step compression method having a higher compression ratio than a compression ratio of a first-step compression method. The second-step compressed data object may be stored in the swap data storage area. Information about the second-step compressed data object stored in the swap data storage area may be registered in the second-step LRU 460.

According to an embodiment, when the first-step LRU 440 is divided into the first-step normal LRU 441 and the first-step preference LRU 442, the recompression daemon

450 may preferentially select a data object registered in the first-step preference LRU 442 over a data object registered in the first-step normal LRU 442 as a second-step compression target.

The recompression daemon 450 may read a data object exceeding a threshold time from among second-step compressed data objects registered in the second-step LRU 460 from the swap data storage area to decompress the second-step compressed data object, and may perform third-step compression on the decompressed second-step compressed data object, and may store the third-step compressed data object in the swap data storage area.

Figure 4C:
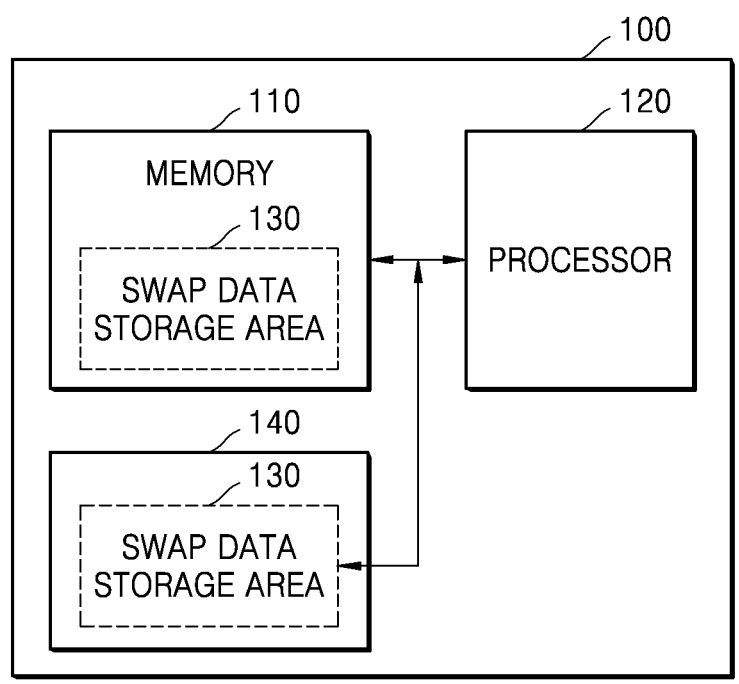
FIG. 4C is a reference diagram for describing a location of a swap data storage area according to an embodiment.

FIG. 4C is a reference diagram for describing a location of a swap data storage area according to an embodiment.

Referring to FIG. 4C, a swap data storage area 130 in which a compressed data object is stored may be included in a kernel area included in a portion of the memory 110.

According to another embodiment, the swap data storage area 130 may be included in an external memory 140 that is a device separate from the memory 110.

Figure 5:
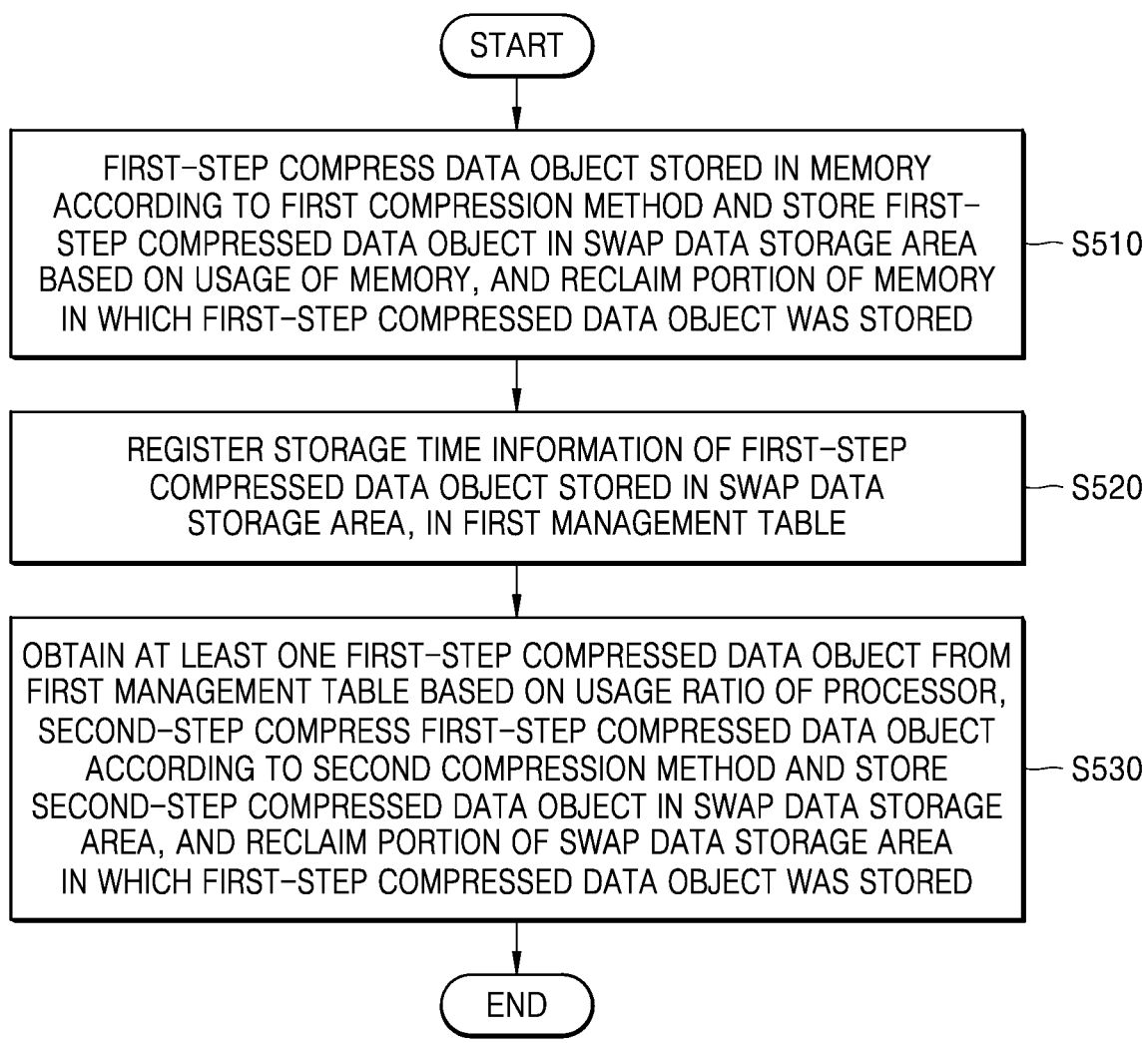
FIG. 5 is a flowchart of a method of performing memory reclamation in a computing device according to an embodiment.

FIG. 5 is a flowchart of a method of performing memory reclamation in a computing device, according to an embodiment.

Referring to FIG. 5, in operation 510, a computing device may perform first-step compression on a data object stored in a memory according to a first compression method and store the first-step compressed data object in a swap data storage area based on a usage of the memory, and reclaim a portion of the memory in which the data object was stored. For example, the computing device may perform first-step compression on the data object stored in the memory as the usage of the memory exceeds a threshold value.

In operation 520, the computing device may register information about the first-step compressed data object stored in the swap data storage area, in a first management table. For example, the information about the first-step compressed data object registered in the first management table may include storage time information indicating a storage time when the first-step compressed data object is stored in the swap data storage area.

In operation 530, the computing device may obtain information about at least one first-step compressed data object from the first management table based on a usage ratio of the processor, perform second-step compression on the first-step compressed data object according to a second compression method, store the second-step compressed data object in the swap data storage area, and reclaim a portion of the swap data storage area in which the first-step compressed data object was stored.

According to an embodiment, the computing device may obtain the information about the at least one first-step compressed data object from the first management table in response to a case where the usage ratio of the processor is reduced to be less than a threshold value.

According to an embodiment, the computing device may obtain information about a first-step compressed data object of which the storage time exceeds a threshold time when obtaining the information about the first-step compressed data object from the first management table.

Figure 6:
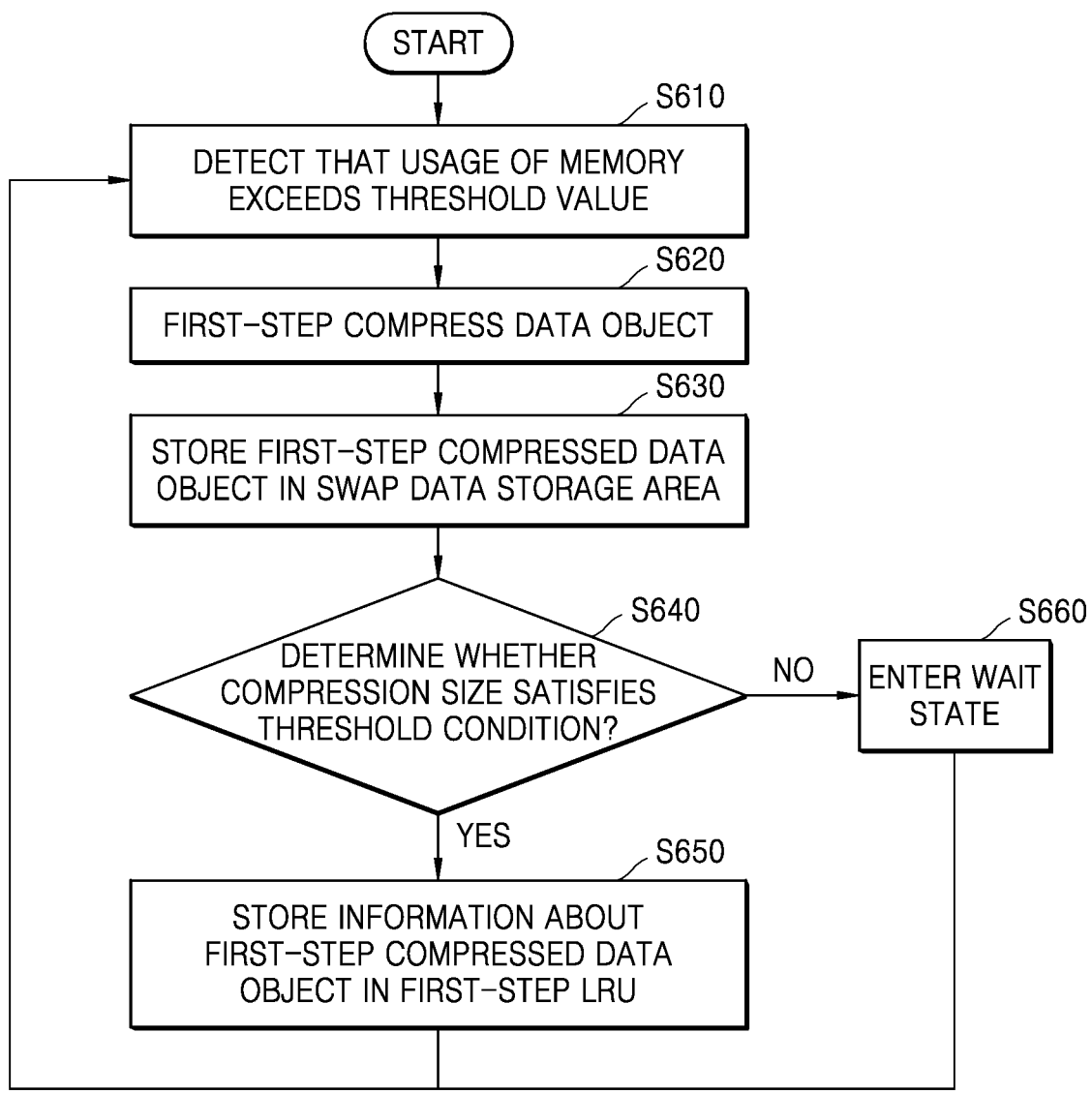
FIG. 6 is a flowchart of a process of first-step compressing a data object in a computing device according to an embodiment.

FIG. 6 is a flowchart of a process of first-step compressing a data object in a computing device, according to an embodiment.

Referring to FIG. 6, in operation 610, a computing device may detect that a usage of a memory exceeds a threshold value.

A kernel may monitor the usage of the memory during an operation of the computing device, and may detect whether the usage of the memory exceeds a pre-determined threshold value. For example, min_free_kbytes may be used as a value indicating the usage of the memory. The computing device may detect whether the usage of the memory exceeds a pre-determined threshold usage value, whether a usage ratio of the memory exceeds a pre-determined threshold ratio value, or whether an available space or a free space of the memory is less than a pre-determined threshold spatial value.

In operation 620, the computing device may first-step compress a data object stored in the memory.

Here, an address system of the data object stored in the memory will be first described.

Figure 7:
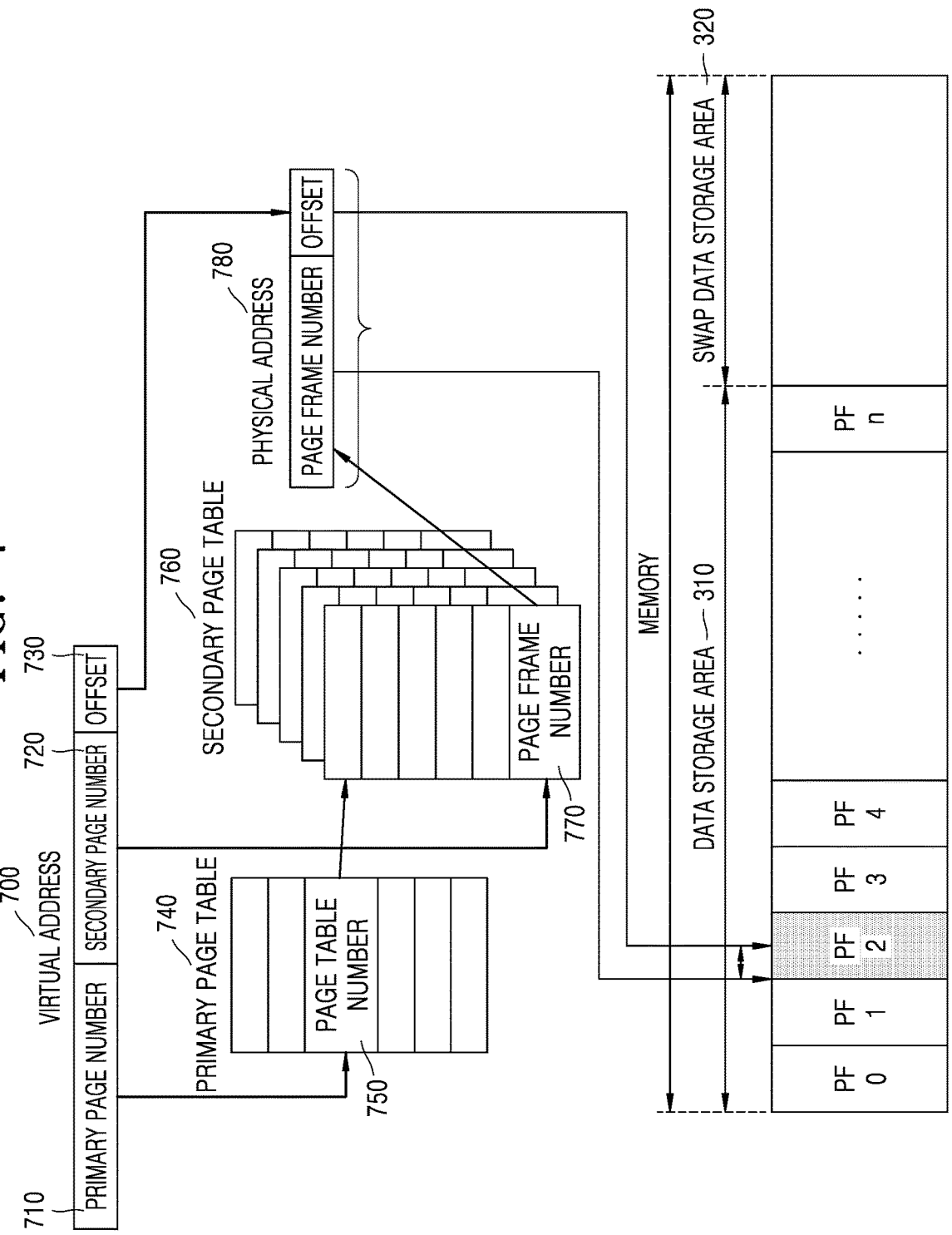
FIG. 7 is a reference diagram for describing an address system of a data object stored in a memory according to an embodiment.

FIG. 7 is a reference diagram for describing an address system of a data object stored in a memory according to an embodiment.

An address system may translate a virtual address into a physical address and may access an address of an actual physical memory by using the physical address. A format of the virtual address may be determined in various ways. For example, a virtual address 700 may include a primary page number 710, a secondary page number 720, and an offset 730. The system may first access a primary page table 740, and may obtain a page table number 750 by using the primary page number 710 included in the virtual address 700. Next, the system may access a page table corresponding to the page table number 750 from a plurality of secondary page tables 760, and may obtain a page frame number 770 by using the secondary page number 720 included in the virtual address. Next, the system may obtain a final physical address 780 of the memory by using the page frame number 770 and the offset 730 included in the virtual address 700. In detail, the system may access a start address of a page frame in the data storage area 310 of a physical memory by using the page frame number 770, and may access an address of actual data to be accessed by using the offset 730.

Referring back to FIG. 6, when it is detected that the usage of the memory exceeds the threshold value in operation 610, a kernel swap daemon for executing a memory reclamation operation may wake up. The kernel swap daemon that is a daemon operated in the background by the kernel may execute a memory reclamation operation to secure an available space of the memory when the usage of the memory increases.

The kernel swap daemon may determine a data object in an area of which the space is to be secured for memory reclamation, and then may break a connection between a virtual address and a physical address of the data object. When the connection between the virtual address and the physical address of the data object is broken, it means that information of a page table used to access the physical address of the data object by using the virtual address is manipulated, to make the physical address invisible when a process attempts to access the data object by using the virtual address. Once the connection between the virtual address and the physical address of the data object is broken, the system may use the physical address to store other data.

The kernel swap daemon may read the data object stored in the memory and may perform first-step compression on the data object by using a first compression method.

The first compression method used in the first-step compression may be determined in various ways. For example, a compression method having a high compression speed may be used considering compression speed performance rather than a compression ratio.

A compression method may be determined according to a compression algorithm and a compression level. Examples of the compression algorithm may include lz4, zstd, and lzma. Also, one compression algorithm may include a plurality of compression levels. For example, the compression algorithm lz4 may include compression levels from 0 to 16.

According to an embodiment, a compression algorithm having excellent compression speed performance may be used as the first compression method.

According to an embodiment, a compression method having a low compression level in the same compression algorithm may be used as the first compression method.

In operation 630, the computing device may store the first-step compressed data object in a swap data storage area.

Specifically, the kernel swap daemon may store the first-step compressed data object in the swap data storage area by using the first compression method.

In operation 640, the computing device may determine whether a compression size of the first-step compressed data object satisfies a threshold condition.

Specifically, the kernel swap daemon may determine whether the compression size of the first-step compressed data object satisfies the threshold condition by determining whether the compression size is greater than a minimum threshold size and less than a maximum threshold size. The reason why a condition including the minimum threshold size and the maximum threshold size is set as the threshold condition is as follows. When the compression size of the first-step compressed data object is less than the minimum threshold size, the first-step compressed data object is already compressed to the smallest size and does not need to be recompressed, and thus has to be excluded from management. Also, when the compression size of the first-step compressed data object is greater than the maximum threshold size, the first-step compressed data object is likely to be an incompressible data object. Therefore, even when a compression operation is attempted once again by using another compression algorithm or compression level, the first-step compressed data object does not have a compression effect anymore and does not need to be recompressed, and has to be excluded from management. As such, for a first-step compressed data object of which the compression size satisfies a certain threshold condition, whether the first-step compressed data object satisfies a threshold condition is determined in order to separately store and manage the first-step compressed data object in an LRU.

When the compression size satisfies the threshold condition, the computing device proceeds to operation 650. However, when the compression size does not satisfy the threshold condition, the computing device proceeds to operation 660 to enter a wait state without storing the first-step compressed data object in the LRU.

In operation 650, when the compression size of the first-step compressed data object satisfies the threshold condition, the computing device may store information about the first-step compressed data object satisfying the threshold condition in a first-step LRU.

According to an embodiment, the kernel swap daemon may store the information of the first-step compressed data object of which the compression size satisfies the threshold condition, in the first-step LRU. A least recently used (LRU) algorithm is a page management algorithm of an operating system that removes a page that is not used for the longest time.

When the kernel swap daemon stores the information about the first-step compressed data object of which the compression size satisfies the threshold condition in the first-step LRU, it means that the information about the first-step compressed data object of which the compression size satisfies the threshold condition is managed by using a first-step LRU algorithm. In the disclosure, for convenience of description, it will be described that the kernel swap daemon stores the information about the first-step compressed data object of which the compression size satisfies the threshold condition in the first-step LRU.

The information about the first-step compressed data object stored in the first-step LRU may include a swap address indicating a location of the swap data storage area in which the first-step compressed data object is stored and storage time information indicating a storage time when the first-step compressed data object is stored in the swap data storage area.

Figure 8:
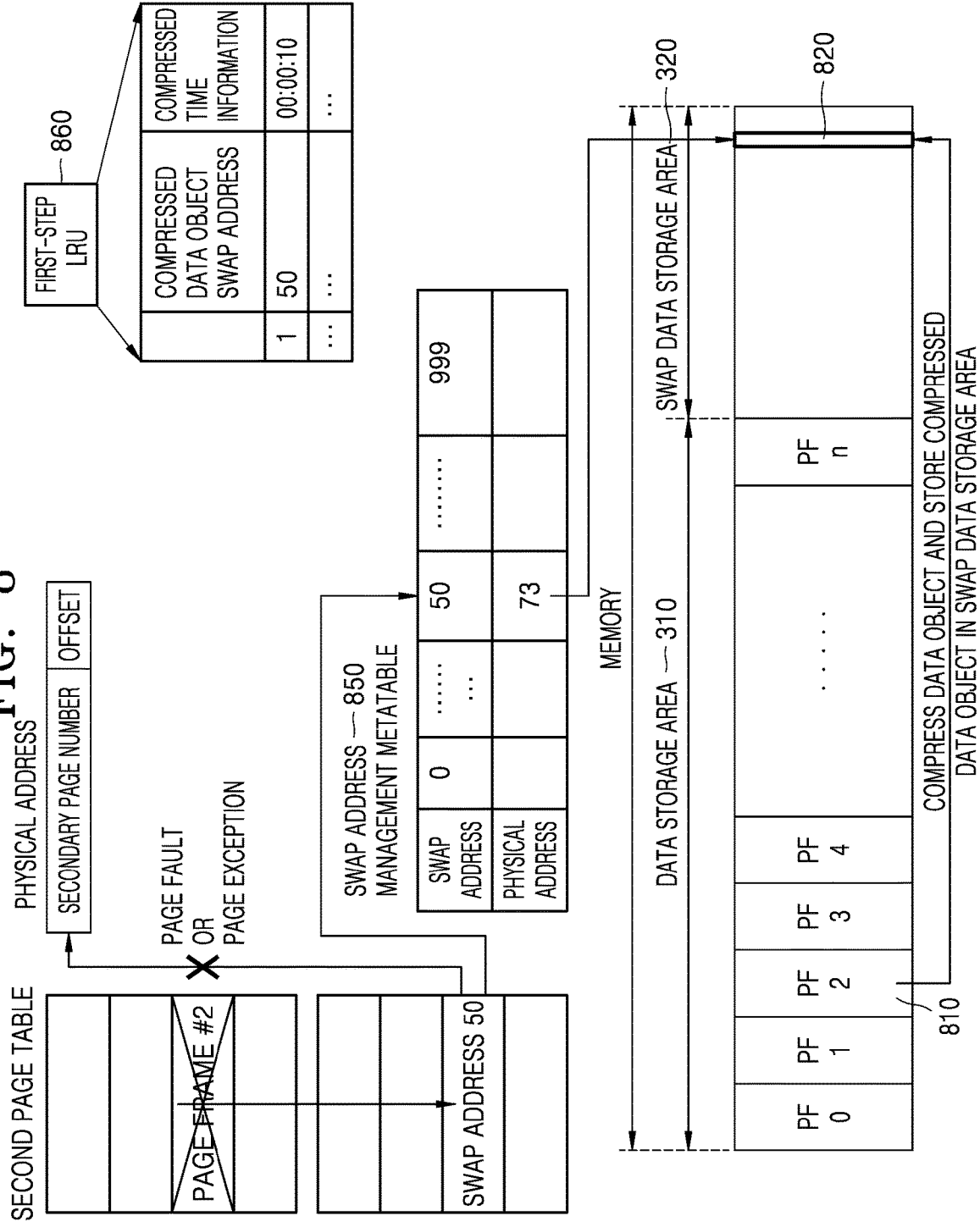
FIG. 8 is a reference diagram for describing an example of first-step compressing a data object of a memory, storing the first-step compressed data object in a swap data storage area, and registering the first-step compressed data object in a first-step least recently used (LRU) according to an embodiment.

FIG. 8 is a reference diagram for describing an example of first-step compressing a data object of a memory, storing the first-step compressed data object in a swap data storage area, and registering the first-step compressed data object in a first-step LRU according to an embodiment.

Referring to FIG. 8, a memory of a computing device may include the data storage area 310 and the swap data storage area 320. The computing device detects that a usage of the memory exceeds a threshold value, reads a data object 810 (e.g., a page frame #2 or PF2) stored in the data storage area 310, and performs first-step compression on the data object 810 according to a first compression method to obtain a first-step compressed data object 820. The computing device stores the first-step compressed data object 820 in the swap data storage area 320.

Also, the computing device updates the page frame #2 that is a page frame number stored in a second page table for memory reclamation to an address of the swap data storage area 320 (e.g., a swap address 50), in which the first-step compressed data object is stored. Because the page frame #2 is removed from the second page table and is released from the data storage area 310, the page frame #2 in the data storage area 310 may be used to store new data. Also, when a swap address, instead of a page frame number, is stored in the second page table and a system accesses the second page table to access data of the data storage area 310 of the memory, the page frame number is not stored, and thus an event such as a "page fault" or a "page exception" occurs. Accordingly, the computing device may recognize the swap address 50 by accessing the second page table by using another process accessible to the swap data storage area 320, determine that the swap address 50 corresponds to a physical address 73 by accessing a swap address management metatable 850, and read the first-step compressed data object 820 by accessing the physical address 73.

Next, when a compression size of the first-step compressed data object 820 satisfies a threshold condition, that is, when the compressions size is greater than a minimum threshold value and less than a maximum threshold value, the computing device stores information about the first-step compressed data object 820 in a first-step LRU 860. The first-step LRU 860 may store 50 as a swap address of the first-step compressed data object 820 and 00:00:10 as time information indicating a time when the first-step compressed data object 820 is stored in the swap data storage area 320. The reason why storage time information is stored in the first-step LRU 860 is to recompress (i.e., second-step compress) data objects beginning from a data object that has been first-step compressed and stored for a long time.

Figure 9:
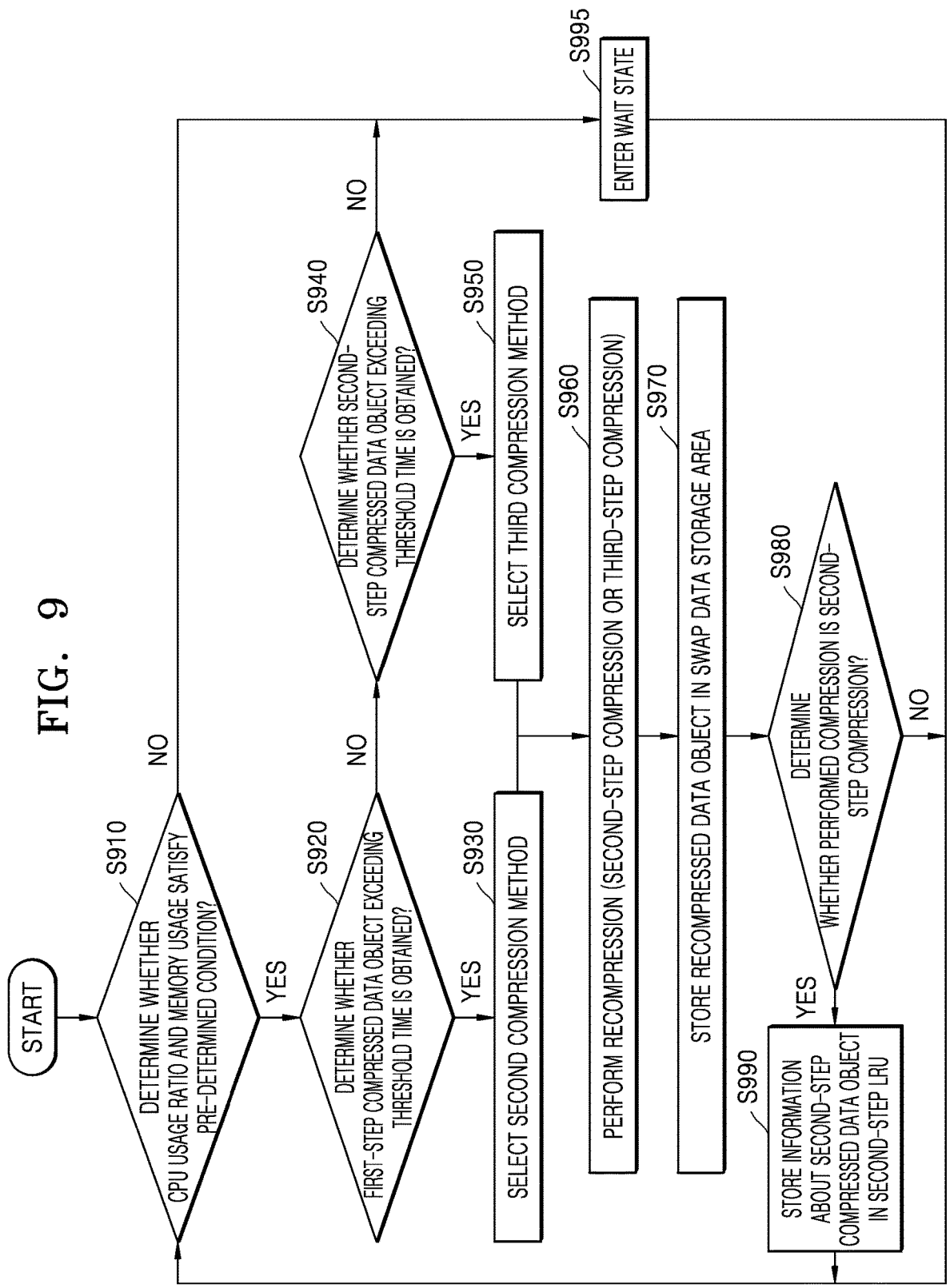
FIG. 9 is a flowchart of a method of second-step compressing a first-step compressed data object in a computing device according to an embodiment.

FIG. 9 is a flowchart of a method of second-step compressing a first-step compressed data object in a computing device according to an embodiment.

Referring to FIG. 9, in operation 910, a computing device may determine whether a CPU usage ratio and a memory usage satisfy a pre-determined condition.

According to an embodiment, because the computing device is to perform second-step compression at a time when the CPU usage ratio is low, the computing device may determine whether the CPU usage ratio is equal to or less than a threshold value. For example, the computing device may determine whether the CPU usage ratio is equal to or less than 50%.

According to an embodiment, the computing device may further consider the memory usage in addition to the CPU usage ratio. For example, the computing device may determine whether the CPU usage ratio is equal to or less than a threshold value pre-determined for the CPU usage ratio, and whether the memory usage exceeds a threshold value pre-determined for the memory usage. When two threshold conditions are satisfied, the computing device proceeds to operation 920, and when the conditions are not satisfied, the computing device proceeds to operation 995 to enter a wait state.

As such, whether the CPU usage ratio and the memory usage satisfy pre-determined conditions may be determined by a recompression daemon. The recompression daemon may periodically wake up and determine whether the CPU usage ratio and the memory usage of operation 910 satisfy pre-determined conditions. For example, the recompression daemon may wake up every 1 second and may perform operation 910.

In operation 920, the computing device may determine whether there is a first-step compressed data object exceeding a threshold time.

Specifically, the recompression daemon may determine whether there is first-step compressed data exceeding a threshold time from a first-step LRU. For example, it may be assumed that "50" is stored as swap address information of a first-step compressed data object corresponding to an index 1 in a first-step LRU and compressed time information is 00:00:10 as shown in FIG. 8. Also, it may be assumed that a current time is 00:00:21 and a threshold time for selecting a second-step compression target is 10 seconds. Because a data object corresponding to the index 1 stored in the first-step LRU was stored at 10 seconds and the current time is 21 seconds, 11 seconds have passed. Accordingly, because the data object corresponding to the index 1 exceeds the threshold time of 10 seconds, the data object corresponding to the index 1 may be determined as a second-step compression target.

In operation 930, when the computing device obtains the first-step compressed data object exceeding the threshold time, the computing device may select a second compression method for a second-step compression to be performed on the first-step compressed data object.

According to an embodiment, a recompression daemon may select a compression algorithm having a high compression ratio or a compression level having a high compression ratio. Because second-step compression is a recompression using a compression method having a higher compression ratio at a time when the CPU is idle, the recompression daemon may select, as the second compression method, a compression method having low compression speed performance but a high compression ratio, rather than a compression method having high compression speed performance.

For example, the recompression daemon may select a compression algorithm having the highest compression ratio as the second compression method.

For example, the recompression daemon may select a level having the highest compression ratio in the same compression algorithm as the second compression method, when the same compression algorithm is selected as that of the first compression method.

In operation 960, the computing device may second-step compress the first-step compressed data object according to the selected second compression method.

In detail, the recompression daemon reads the first-step compressed data object from a swap data storage area to decompress the first-step compressed data object, and second-step compresses the decompressed data object by using the second compression method.

In operation 970, the computing device may store the second-step compressed data object through recompression in the swap data storage area.

For example, the recompression daemon stores the second-step compressed data object through recompression in the swap data storage area, and releases a portion of the swap data storage area in which the first-step compressed data object was stored. Once the portion of the swap device in which the first-step compressed data object was stored is released, the portion becomes an available space in which other data may be stored.

In operation 980, the computing device may determine whether the compression performed in operation 960 is second-step compression. When the compression performed in operation 960 is the second-step compression, the computing device stores information about the second-step compressed data object in a second-step LRU. When the compression performed in operation 960 is not a second-step compression, that is, for example, a third-step compression, the computing device proceeds to operation 910 in order to not perform separate LRU management.

In operation 990, when it is determined that the compression performed in operation 960 is the second-step compression, the computing device may store information about the second-step compressed data object in the second-step LRU. Information stored in the second-step LRU may include a swap address indicating a location at which the second-step compressed data object is stored in the swap data storage area and time information indicating a time when the second-step compressed data object is stored in the swap data storage area, like in the first-step LRU.

Figure 10:
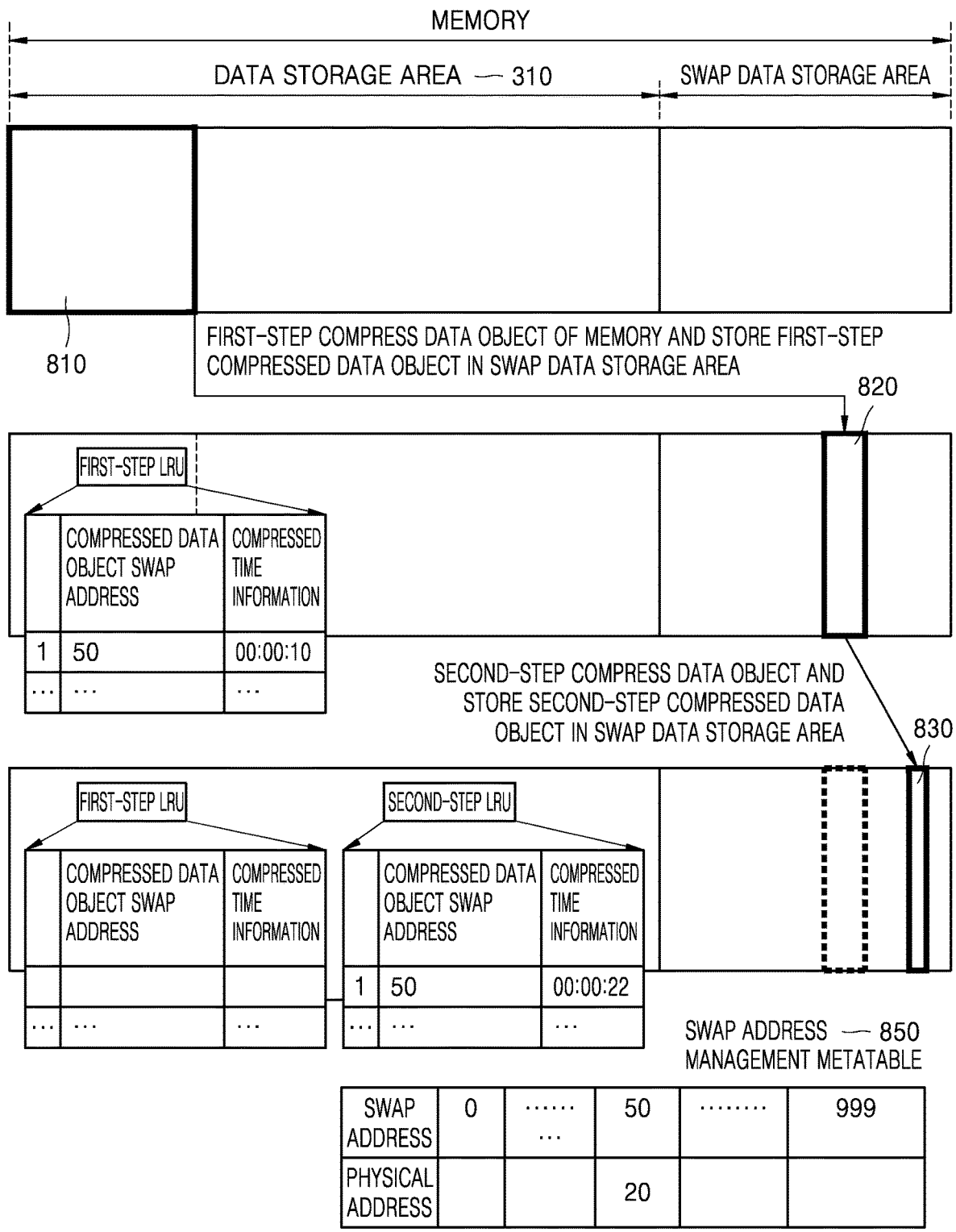
FIG. 10 is a reference diagram for describing a second-step compression operation according to an embodiment.

FIG. 10 is a reference diagram for describing a second-step compression operation according to an embodiment.

For example, it is assumed that 50 is stored as a swap address of the first-step compressed data object 820 corresponding to an index 1 in a first-step LRU and stored time information is 00:00:10 as shown in FIG. 10. It is assumed that a current time is 00:00:21 and a threshold time for selecting a second-step compression target is 10 seconds. Accordingly, because the first-step compressed data object 820 stored in the first-step LRU was stored at 10 seconds and the current time is 21 seconds, 11 seconds have passed. Because the first-step compressed data object 820 exceeds the threshold time of 10 seconds, the first-step compressed data object 820 may be determined as a second-step compression target, and the computing device may read the first-step compressed data object 820 from the physical address 73 corresponding to the swap address 50 of a swap data storage area to decompress the first-step compressed data object 820, perform second-step compression on the decompressed first-step compressed data object by using a newly determined second compression method to obtain a second-step compressed data object 830, and store the second-step compressed data object 830 in a physical address 20 of the swap data storage area again.

Next, the computing device may remove an entry corresponding to the index 1 stored in the first-step LRU, and may store the swap address 50 and the time 00:00:22 as time information indicating a time when the second-step compressed data object 830 is stored in the swap data storage area as information about the second-step compressed data object 830 in the second-step LRU. Also, the computing device may update the physical address corresponding to the swap address 50 from 73 to 20 in the swap address management metatable 850 to update the physical address at which the second-step compressed data object 830 is stored. As such, because the computing device compresses the first-step compressed data object 820 stored at the physical address 73 by using a second compression method having a higher compression ratio, stores the second-step compressed data object 830 in the swap data storage area, and releases the physical address 73 from the swap address management metatable 850, the computing device may use the physical address 73 to store other data.

Furthermore, third-step compression will be described with reference to FIG. 9.

When the computing device determines in operation 920 of FIG. 9 that there is no first-step compressed data object exceeding the threshold time, the computing device may proceed to operation 940.

In operation 940, the computing device may determine whether there is a second-step compressed data object exceeding a threshold time. When second-step compressed data exceeding the threshold time is obtained, the computing device proceeds to operation 950. When there is no second-step compressed data exceeding the threshold time, the computing device proceeds to operation 995 to enter a wait state.

According to an embodiment, the recompression daemon may determine whether there is second-step compressed data exceeding the threshold time from the second-step LRU. For example, it is assumed that a second-step compressed data object corresponding to the swap address 50 is stored in the second-step LRU and compressed time information is 00:00:22 as shown in FIG. 10. It is assumed that a current time is 00:00:33 and a threshold time for selecting a recompression target is 10 seconds. Accordingly, because the second-step compressed data object stored in the second-step LRU was stored at 22 seconds and the current time is 33 seconds, 11 seconds have passed. Accordingly, because the second-step compressed data object exceeds the threshold time of 10 seconds, the second-step compressed data object corresponding to the swap address 50 may be determined as a third-step compression target.

In operation 950, when the computing device obtains the second-step compressed data object exceeding the threshold time, the computing device may select a third compression method for third-step compressing the second-step compressed data object.

According to an embodiment, the recompression daemon may select a compression algorithm having a high compression ratio or a compression level having a high compression ratio as the third compression method. Because third-step compression is recompression using a compression method having a higher compression ratio at a time when the CPU is idle, the recompression daemon selects, as the third compression method, a compression method having low compression speed performance but a high compression ratio, rather than a compression method having high compression speed performance. Here, the compression ratio of the third compression method may be higher than the compression ratios of the first compression method and the second compression method.

For example, the recompression daemon may select a compression algorithm having a high compression ratio as the third compression method.

In addition, the recompression daemon may select a level having a high compression ratio in the same first compression method as the third compression method, when the same compression algorithm as that of the first compression method is used.

In operation 960, the computing device may perform third-step compression on the second-step compressed data object according to the selected third compression method.

Specifically, the recompression daemon reads the second-step compressed data object from the swap data storage area to decompress the second-step compressed data object, and third-step compress the decompressed data object by using the third compression method.

In operation 970, the computing device may store the third-step compressed data object through recompression in the swap data storage area.

According to an embodiment, the recompression daemon stores the third-step compressed data object through recompression in the swap data storage area, and releases a portion of the swap data storage area in which the second-step compressed data object was stored. Once the portion of the swap data storage area in which the second-step compressed data object was stored is released, the portion becomes an available space in which other data may be stored.

In operation 980, the computing device may determine whether compression performed in operation 960 is second-step compression. Because the compression performed in operation 960 is the third-step compression, the computing device proceeds to operation 910 without separate LRU management. That is, because the third-step compressed data object is no longer a recompression target and thus does not need to be stored in an LRU. According to an embodiment, when the third-step compression is performed, third-step LRU management may not performed on a third-step compressed data object. However, when an algorithm for performing up to fourth-step compression is used, the third-step compressed data object may be registered in a third-step LRU.

Figure 11:
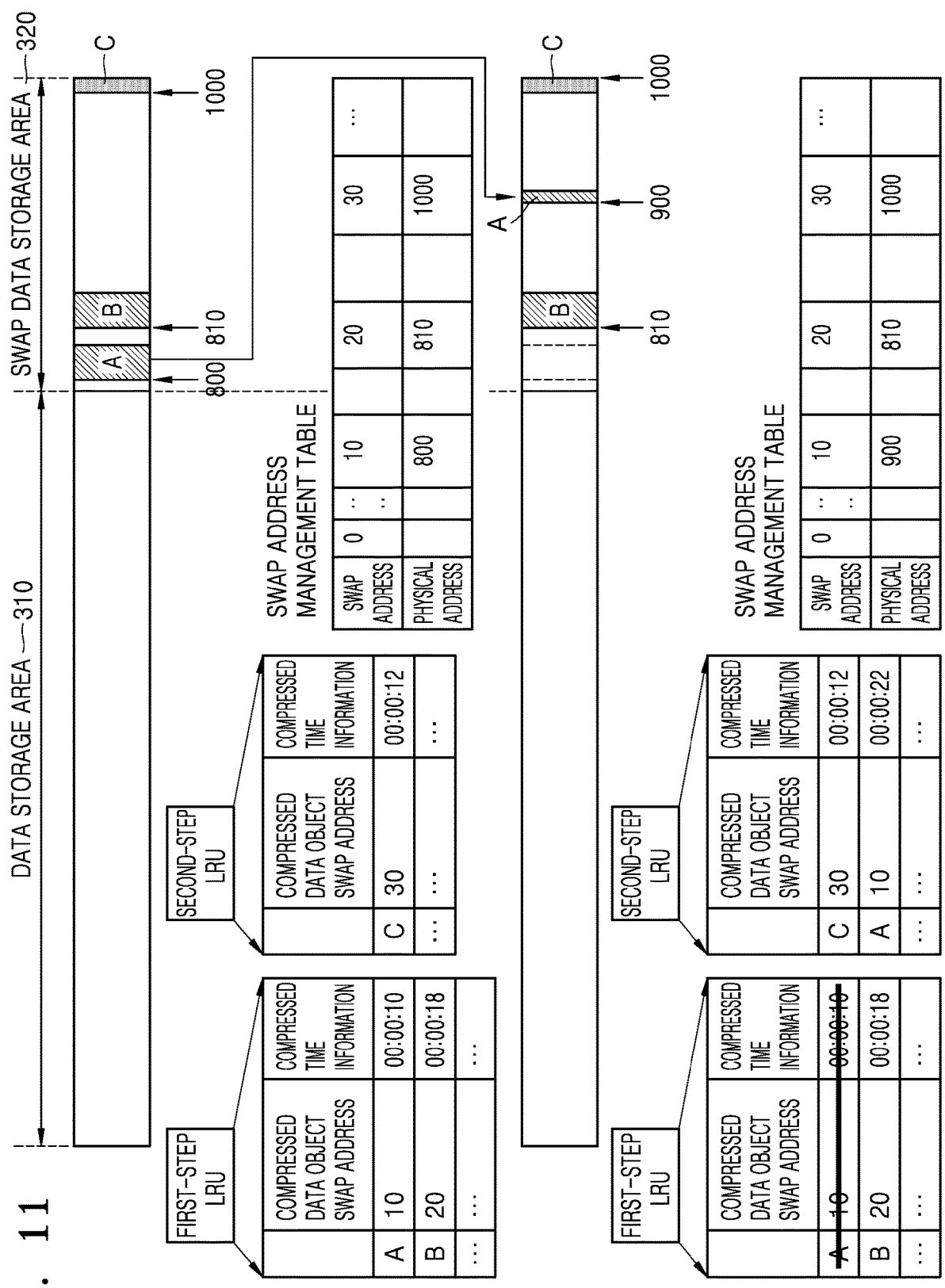
FIG. 11 is a reference diagram for describing an example of performing second-step compression according to an embodiment.

FIG. 11 is a reference diagram for describing an example of performing second-step compression according to an embodiment.

Referring to FIG. 11, for a data object A stored in a first-step LRU, a compressed data object swap address is 10 and compressed time information is 00:00:10, and for a data object B stored in the first-step LRU, a compressed data object swap address is 20 and compressed time information is 00:00:18. For a data object C stored in a second-step LRU, a compressed data object swap address is 30 and compressed time information is 00:00:12. It is assumed that a current time is 00:00:21 and a threshold time for selecting a second-step compression target or a third-step compression target is 10 seconds. Then, the data object A stored in the first-step LRU has been stored for 11 seconds, the data object B stored in the first-step LRU has been stored for 3 seconds, and the data object C stored in the second-step LRU has been stored for 9 seconds. Accordingly, the data object A of the first-step LRU exceeding the threshold time of 10 seconds is determined as a second-step compression target, and a computing device may read the first-step compressed data object A from a physical address 800 of a swap data storage area corresponding to a swap address 10 to decompress the first-step compressed data object A, perform second-step compression on the decompressed data object A by using a newly determined second compression method, and store the second-step compressed data object A again at a physical address 900 of the swap data storage area.

Next, the computing device may remove an entry corresponding to the first-step compressed data object A stored in the first-step LRU, and may store the swap address 10 of the second-step compressed data object A and the time 00:00:22 as second-step compression time information about the second-step compressed data object A in the second-step LRU. The computing device may update a physical address corresponding to a logical address 10 of the data object A from 800 to 900 in a swap address management table. As such, because the physical address corresponding to the logical address 10 of the data object A is updated to 900, a system may release a space corresponding to the physical address 800 and may use the space corresponding to the physical address 800 to store other data.

Figure 12:
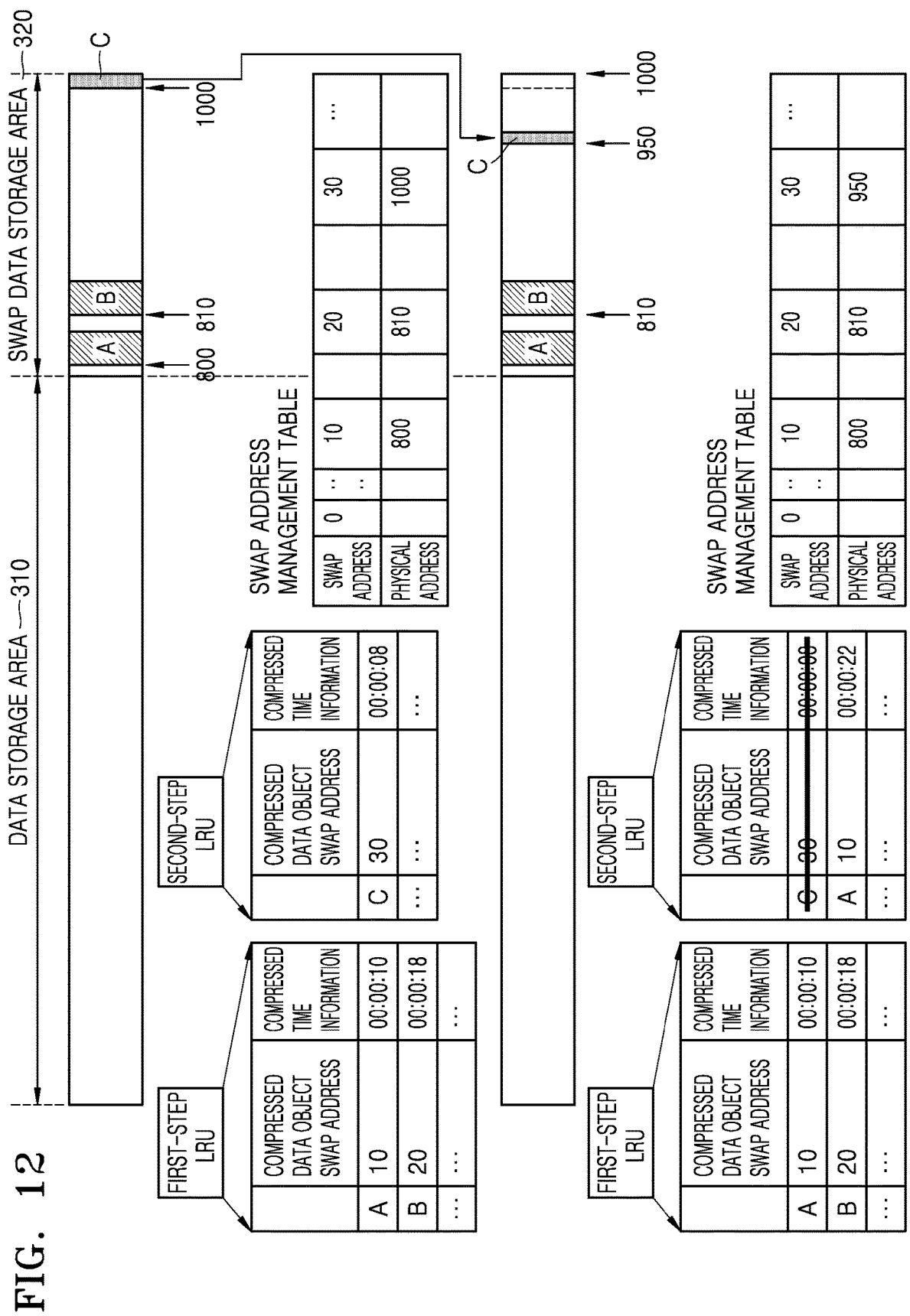
FIG. 12 is a reference diagram for describing an example of performing third-step compression according to an embodiment.

FIG. 12 is a reference diagram for describing an example of performing third-step compression according to an embodiment.

Referring to FIG. 12, for a data object A stored in a first-step LRU, a first-step compressed data object swap address is 10 and compressed time information is 00:00:10, and for a data object B stored in the first-step LRU, a first-step compressed data object swap address is 20 and compressed time information is 00:00:18. For a data object C stored in a second-step LRU, a second-step compressed data object swap address is 30 and compressed time information is 00:00:08. It is assumed that a current time is 00:00:19 and a threshold time for selecting a second-step compression target or a third-step compression target is 10 seconds. The data object A stored in the first-step LRU has been stored for 9 seconds, the data object B stored in the first-step LRU has been stored for 1 second, and the data object C stored in the second-step LRU has been stored for 11 seconds. Accordingly, the data object C of the second-step LRU exceeding the threshold time of 10 seconds may be determined as a third-step compression target, and a computing device may read the second-step compressed data object C from a physical address 1000 of a swap data storage area to decompress the second-step compressed data object C, may third-step compress the decompressed data object C by using a newly determined third compression method, and may store the third-step compressed data object C again, for example, at a physical area 950 of the swap data storage area. Here, the threshold time of 10 seconds is used for both the first-step LRU and the second-step LRU as an example, however, the embodiment is not limited thereto. The threshold time for the first-step LRU and the second-step LRU may be different depending on a configuration of the computing device.

Next, the computing device releases content about the second-step compressed data object C stored in the second-step LRU. That is, the computing device may remove an entry corresponding to the second-step compressed data object C in the second-step LRU, and may update a physical address corresponding to a logical address 30 of the data object C from 1000 to 950 in a swap address management table. As such, because the physical address corresponding to the logical address 30 of the data object C is updated to 950, a system may release a space corresponding to the physical address 1000 and may use the space corresponding to the physical address 1000 to store other data. Also, when the computing device performs up to third-step compression on a data object and does not perform fourth-step compression, the computing device may not manage a third-step compressed data object in an LRU. According to another embodiment, when the computing device performs up to fourth-step compression on a data object, the computing device may generate a third-step LRU for managing third-step compressed data objects.

In the above embodiments, a case where a computing device selects a first-step compressed data object that has been stored for a long time as a second-step compression target during memory reclamation has been described.

However, the computing device may preferentially select a non-killable data object from among first-step compressed data objects as a second-step compression target during memory reclamation.

For example, a system includes non-killable programs called VIP programs. The non-killable programs include, for example, programs for launching applications when the system is booted and programs for adjusting a video screen or a volume. When the programs are removed from a memory, the system crashes. Accordingly, the programs must not be removed and thus may be referred to as non-killable programs. Because the non-killable programs must always stay alive in the system and the system may not normally operate when the non-killable programs are terminated. Accordingly, the computing device may preferentially select a non-killable data object as a secondary compression target so as to provide more free space in the memory by compressing the non-killable data.

A method of performing a memory reclamation operation by selecting a secondary compression target data object by using characteristics of a data object will be described with reference to FIGS. 13 through 15.

Figure 13:
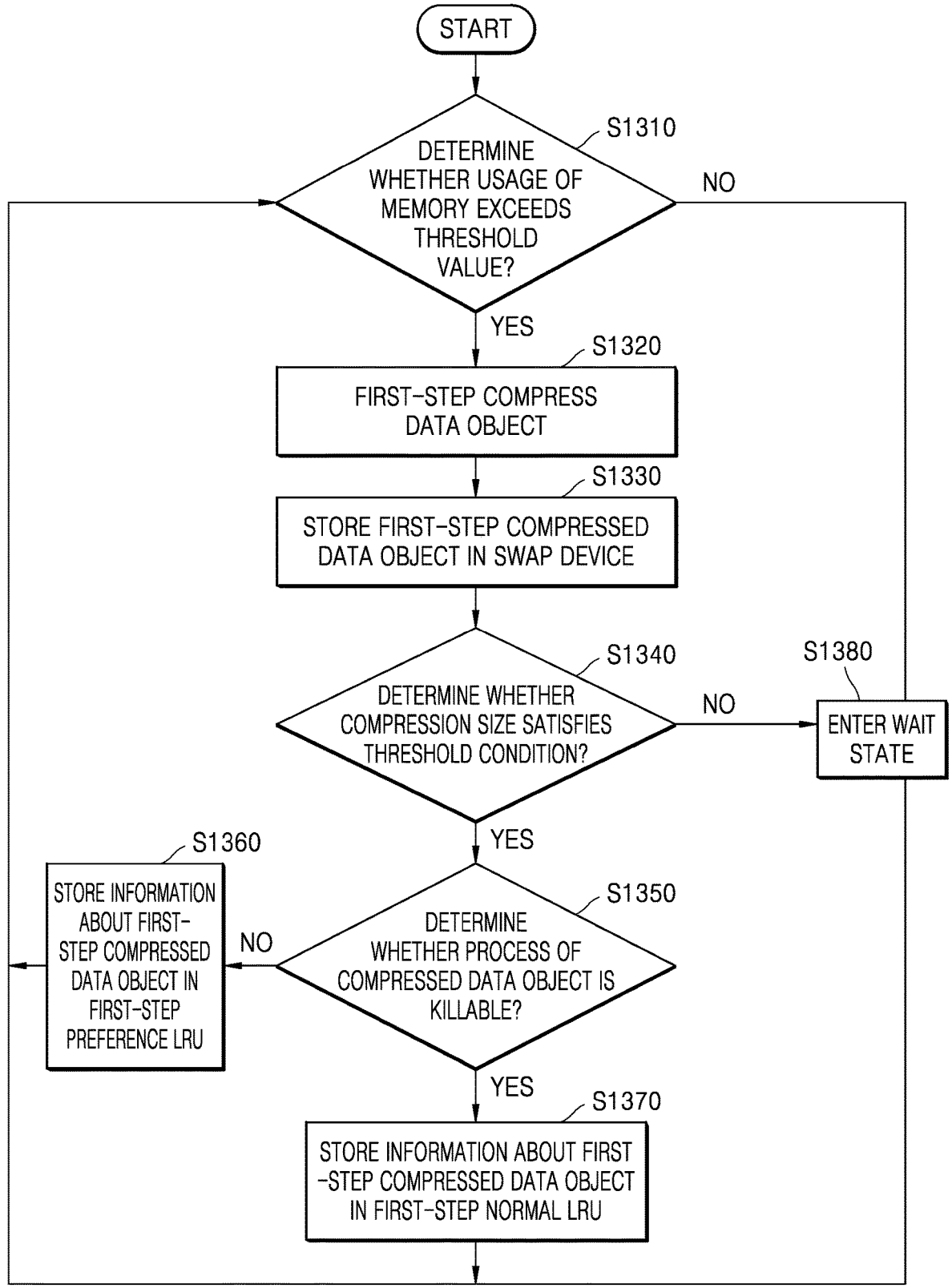
FIG. 13 is a flowchart of a method of performing first-step compression by using characteristics of a data object in a memory reclamation operation according to an embodiment.

FIG. 13 is a flowchart of a method of performing first-step compression by using characteristics of a data object in a memory reclamation operation according to an embodiment. The flowchart of FIG. 13 is similar to the flowchart of FIG. 6 except for operations 1350, 1360, and 1370. Accordingly, similar operations will be briefly described.

Referring to FIG. 13, in operation 1310, a computing device determines whether a usage of a memory exceeds a threshold value. When the usage of the memory does not exceed the threshold value, the computing device may proceed to operation 1380 to enter a wait state, and when the usage of the memory exceeds the threshold value, the computing device may proceed to operation 1320.

In operation 1320, the computing device may perform first-step compression on a data object stored in the memory.

In operation 1330, the computing device may store the first-step compressed data object in a swap data storage area.

In operation 1340, the computing device may determine whether a compression size of the first-step compressed data object satisfies a threshold condition. When the compression size does not satisfy the threshold condition, the computing device proceeds to operation 1380 to enter a wait state, and when the compression size satisfies the threshold condition, the computing device proceeds to operation 1350.

In operation 1350, when the compression size of the first-step compressed data object satisfies the threshold condition, the computing device may determine attributes of a process corresponding to the data object and determine whether the process is a killable process.

Specifically, a kernel swap daemon may determine whether a process of a page is killable by using attribute information included in a page table entry that manages each page of the memory. For example, the kernel swap daemon may determine whether the process corresponding to the data object is a killable process by using "access control information" from among attribute information included in the page table entry corresponding to the compressed data object.

In operation 1360, when the process corresponding to the first-step compressed data object is non-killable, the computing device may store information about the first-step compressed data object in a first-step preference LRU.

In operation 1370, when the process corresponding to the first-step compressed data object is killable, the computing device may store information about the first-step compressed data object in a first-step normal LRU.

As such, in FIG. 13, the computing device considers characteristics of a process of a first-step compressed data object of a memory to be reclaimed to determine whether the process is killable, and stores information about the first-step compressed data object in the first-step preference LRU or the first-step normal LRU according to whether the process is killable. When the process of the first-step compressed data object is killable, the information may be stored in the first-step normal LRU, and when the process of the first-step compressed data object is non-killable, the information may be stored in the first-step preference LRU. When a second-step compression target is selected, the first-step compressed data object stored in the first-step preference LRU may be preferentially selected as the second-step compression target. That is, the first-step compressed data object stored in the first-step preference LRU may receive priority over the data object stored in the first-step normal LRU to perform the second-step compression.

Figure 14:
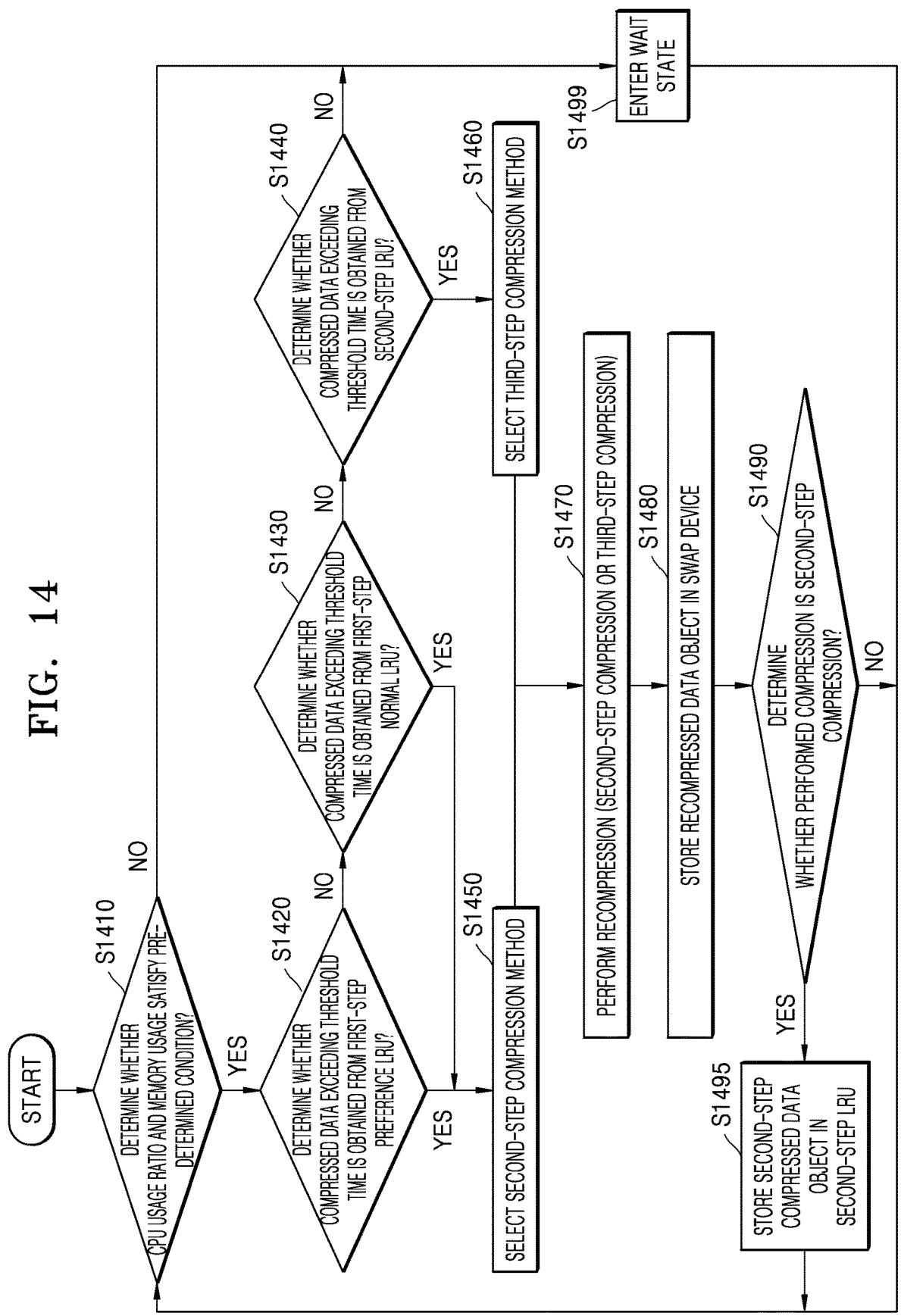
FIG. 14 is a flowchart of a method of performing second-step compression by using characteristics of a data object in a memory reclamation operation according to an embodiment.

FIG. 14 is a flowchart of a method of performing second-step compression by using characteristics of a data object in a memory reclamation operation according to an embodiment of the disclosure. The flowchart of FIG. 14 is similar to the flowchart of FIG. 9 except for operation 1420. Accordingly, similar operations will be briefly described.

Referring to FIG. 14, in operation 1410, a computing device may determine whether a CPU usage ratio and a memory usage satisfy a pre-determined condition. When the CPU usage ratio and the memory usage do not satisfy the pre-determined conditions, the computing device proceeds to operation 1499 to enter a wait state, and when the CPU usage ratio and the memory usage satisfy the pre-determined conditions, the computing device proceeds to operation 1420.

In operation 1420, the computing device may determine whether there is a first-step compressed data object exceeding a threshold time in a first-step preference LRU. In operation 1450, when there is a first-step compressed data object exceeding the threshold time in the first-step preference LRU, the computing device selects a second-step compression method for performing second-step compression on the first-step compressed data object in the first-step preference LRU.

In operation 1430, when there is no first-step compressed data object exceeding the threshold time in the first-step preference LRU, the computing device may determine whether there is a first-step compressed data object exceeding a threshold time in a first-step normal LRU. In operation 1450, when there is a first-step compressed data object exceeding the threshold time in the first-step normal LRU, the computing device selects the second-step compression method for second-step compressing the first-step compressed data object in the first-step normal LRU.

In operation 1440, when there is no first-step compressed data object exceeding the threshold time in the first-step normal LRU, the computing device may determine whether there is a second-step compressed data object exceeding a threshold time in a second-step LRU. In operation 1460, when there is a second-step compressed data object exceeding the threshold time in the second-step LRU, the computing device selects a third-step compression method for performing third-step compression on the second-step compressed data object in the second-step LRU.

As such, in FIG. 14, a first-step LRU is divided into a first-step preference LRU and a first-step normal LRU, in which a data object corresponding to a killable process is managed in the first-step normal LRU and a data object corresponding to a non-killable process is managed in the first-step preference LRU. When a second-step compression target is to be selected, a data object registered in the first-step preference LRU is preferentially considered over a data object registered in the first-step normal LRU, because a data object of a non-killable process that must always stay alive during an operation of a computing device, and may be preferentially second-step compressed. This is because, when a killable process is selected as a second-step compression target, the effort of performing secondary compression by using time and resources of a computing device becomes less effective since the killable process may be terminated in the system, and thus, it is more efficient to select a process that will never be killed as a secondary compression target. Remaining operations 1470, 1480, 1490, and 1495 are the same as the corresponding operations shown in FIG. 9, and thus a further explanation will be omitted.

FIG. 15 is a reference diagram for describing an example of preparing a first-step preference LRU by using characteristics of data and performing second-step compression according to an embodiment.

Referring to FIG. 15, for a data object A stored in a first-step preference LRU, a compressed data object swap address is 10 and compressed time information is 00:00:10. Fora data object B stored in a first-step normal LRU, a compressed data object swap address is 20 and compressed time information is 00:00:09. It is assumed that a current time is 00:00:21 and a threshold time for selecting a second-step compression target is 10 seconds. The data object A stored in the first-step preference LRU has been stored for 11 seconds, and the data object B stored in the first-step normal LRU has been stored for 12 seconds. Accordingly, because the data object B registered in the first-step normal LRU has been stored longer than the data object A registered in the first-step preference LRU, if the first-step preference LRU and the first-step normal LRU are not separately classified, the data object B registered in the first-step normal LRU may be first selected as a second-step compression target.

However, a data object corresponding to a non-killable process is registered in the first-step preference LRU and a data object corresponding to a killable process is registered in the first-step normal LRU. Accordingly, in an embodiment where a data object corresponding to a non-killable process preferentially becomes a second-step compression target, a computing device may first select the data object A registered in the first-step preference LRU as a second-step compression target, perform second-step compression on the data object A, store the second-step compressed data object A in a swap data storage area, and register information about the second-step compressed data object A in a second-step LRU.

An operating method of a computing device according to the embodiments of the disclosure may be implemented in the form of program commands executable by various computer means and may be recorded on a computer-readable recording medium. The computer-readable recording medium may include program commands, data files, data structures, or a combination thereof. The program commands recorded on the computer-readable recording medium may be those specially designed and configured for the disclosure, or those known to and usable by one of ordinary skill in the art of computer software. Examples of the computer-readable recording medium include magnetic media (e.g., hard disks, floppy disks, and magnetic tape), optical media (e.g., compact disk read-only memories (CD-ROMs) and digital versatile disks (DVDs)), magneto-optical media (e.g., floptical disks), and hardware devices (e.g., read-only memories (ROMs), random-access memories (RAMs), and flash memories, etc.) that are specially configured to store and execute program commands. Examples of the program commands include high-level language code that may be executed by a computer using an interpreter as well as machine language code made by a compiler.

Unlike in the related art in which memory compression is performed by using only one compression algorithm and level selected by preferentially considering compression speed performance, according to various embodiments of the disclosure, the effect on compression speed performance may be minimized and more available memory space may be secured by performing recompression by using a level having a high compression ratio when a CPU usage is not high. Because compression is affected by a compression algorithm level, whereas decompression is performed regardless of a compression level, it does not take more time to perform decompression even when compression is performed by using a compression method having a high compression ratio. In a current TV system, a space allocated as a swap area is set to 50% of an entire memory. This means that a product using a 1G memory system may use up to 500 MB as a swap space and use the swap space as a compressed space. As in the disclosure, when data is compressed by using a level of a compression algorithm having a high compression ratio and is stored in a memory space, a usage of a compressed area memory used in the related art may be reduced and a usage of an entire system memory may be additionally reduced.

While one or more embodiments of the disclosure have been described with reference to the figures, it will be understood by one of ordinary skill in the art that various changes in form and details may be made therein without departing from the scope of the disclosure as defined by the following claims.

What is claimed is:

1. A computing device comprising:
a memory storing one or more instructions; and
a processor configured to execute the one or more instructions stored in the memory to:
perform a first compression on a data object stored in the memory according to a first compression method, store the first compressed data object in a swap data storage area, and reclaim a portion of the memory in which the data object was stored;
determine whether a size of the first compressed data object satisfies a threshold condition, by identifying whether the size of the first compressed data object is greater than a minimum threshold value and less than a maximum threshold value;
in response to determining that the size of the first compressed data object satisfies the threshold condition, register information about the first compressed data object stored in the swap data storage area, in a first management table for selecting a data object to be second compression performed;
in response to determining that the size of the first compressed data object does not satisfy the threshold condition, omit registering the information about the first compressed data object in the first management table;
obtain the information about the first compressed data object from the first management table to select a data object to be second compression performed;
perform decompression of the first compressed data object; and
perform a second compression on the decompressed first compressed data object according to a second compression method, the second compression method having a lower compression speed performance and a higher compression ratio than the first compression method, store the second compressed data object in the swap data storage area, and reclaim a portion of the swap data storage area in which the first compressed data object was stored.

2. The computing device of claim 1, wherein the information about the first compressed data object registered in the first management table comprises a first storage time indicating a time when the first compressed data object is stored in the swap data storage area, and
wherein the processor is further configured to execute the one or more instructions to determine whether the first storage time of the first compressed data object exceeds a threshold time.

3. The computing device of claim 2, wherein the processor is further configured to execute the one or more instructions to obtain the information about the first compressed data object of which the first storage time exceeds the threshold time from the first management table, in response to a usage ratio of the processor being less than a first threshold value and a usage of the memory exceeding a second threshold value.

4. The computing device of claim 1, wherein the swap data storage area is a portion of the memory.

5. The computing device of claim 1, wherein the second compression method has a compression ratio different from a compression ratio of the first compression method.

6. The computing device of claim 1, wherein the processor is further configured to execute the one or more instructions to register a second storage time indicating a time when the second compressed data object is stored in the swap data storage area, in a second management table.

7. The computing device of claim 6, wherein the processor is further configured to execute the one or more instructions to:
obtain the second compressed data object of which the second storage time exceeds a threshold time, and
perform a third compression on the second compressed data object according to a third compression method, store the third compressed data object in the swap data storage area, and reclaim a portion of the swap data storage area in which the second compressed data object was stored.

8. The computing device of claim 1, wherein the first management table comprises a first preference table and a first normal table, and
wherein the processor is further configured to execute the one or more instructions to:
register the first compressed data object in the first preference table based on a process corresponding to the first compressed data object stored in the swap data storage area being a non-killable process, and register the first compressed data object in the first normal table based on a process corresponding to the first compressed data object stored in the swap data storage area being a killable process.

9. The computing device of claim 8, wherein the processor is further configured to execute the one or more instructions to preferentially select the first compressed data object registered in the first preference table over the first compressed data object registered in the first normal table, as a second compression target data object in response to a usage ratio of the processor being less than a first threshold value.

10. An operating method of a computing device, the operating method comprising:
performing a first compression on a data object stored in a memory according to a first compression method, storing the first compressed data object in a swap data storage area, and reclaiming a portion of the memory in which the data object was stored;
determining whether a size of the first compressed data object satisfies a threshold condition, by identifying whether the size of the first compressed data object is greater than a minimum threshold and less than a maximum threshold value;
in response to determining that the size of the first compressed data object satisfies the threshold condition, registering information about the first compressed data object stored in the swap data storage area, in a first management table for selecting a data object to be second compression performed;
in response to determining that the size of the first compressed data object does not satisfy the threshold condition, omitting registering the information about the first compressed data object in the first management table;
obtaining the information about the first compressed data object from the first management table to select a data object to be second compression performed;
performing decompression of the first compressed data object; and
performing a second compression on the decompressed first compressed data object according to a second compression method, the second compression method having a lower compression speed performance and a higher compression ratio than the first compression method, storing the second compressed data object in the swap data storage area, and reclaiming a portion of the swap data storage area in which the first compressed data object was stored.

11. The operating method of claim 10, wherein the information about the first compressed data object registered in the first management table comprises a first storage time indicating a time when the first compressed data object is stored in the swap data storage area, and
wherein the operating method further comprises determining whether the first storage time of the first compressed data object exceeds a threshold time.

12. The operating method of claim 11, further comprising obtaining the information about the first compressed data object of which the first storage time exceeds the threshold time from the first management table, in response to a usage ratio of a processor of the computing device being less than a first threshold value and a usage of the memory exceeding a second threshold value.

13. The operating method of claim 10, wherein the second compression method has a compression ratio different from a compression ratio of the first compression method, and wherein the compression ratio of the second compression method is higher than the compression ratio of the first compression method.

14. The operating method of claim 10, further comprising registering a second storage time indicating a time when the second compressed data object is stored in the swap data storage area, in a second management table.

15. The operating method of claim 14, further comprising:
obtaining the second compressed data object of which the second storage time exceeds a threshold time, and
performing a third compression on the second compressed data object according to a third compression method, storing the third compressed data object in the swap data storage area, and reclaiming a portion of the swap data storage area in which the second compressed data object was stored.

16. The operating method of claim 10, wherein the first management table comprises a first preference table and a first normal table,
wherein the operating method further comprises:
registering the first compressed data object in the first preference table based on a process corresponding to the first compressed data object stored in the swap data storage area being a non-killable process, and
registering the first compressed data object in the first normal table based on a process corresponding to the first compressed data object stored in the swap data storage area being a killable process.

17. The operating method of claim 16, further comprising preferentially selecting the first compressed data object registered in the first preference table over the first compressed data object registered in the first normal table, as a second compression target data object in response to a usage ratio of a processor of the computing device being less than a first threshold value.

18. A non-transitory computer-readable recording medium having recorded thereon a computer program for executing an operating method of a computing device, the operating method comprising:
performing a first compression on a data object stored in a memory according to a first compression method, storing the first compressed data object in a swap data storage area, and reclaiming a portion of the memory in which the data object was stored;
determining whether a size of the first compressed data object satisfies a threshold condition, by identifying whether the size of the first compressed data object is greater than a minimum threshold and less than a maximum threshold value;
in response to determining that the size of the first compressed data object satisfies the threshold condition, registering information about the first compressed data object stored in the swap data storage area, in a first management table for selecting a data object to be second compression performed;
in response to determining that the size of the first compressed data object does not satisfy the threshold condition, omitting registering the information about the first compressed data object in the first management table;
obtaining the information about first compressed data object from the first management table to select a data object to be second compression performed;
performing decompression of the first compressed data object; and
performing a second compression on the decompressed first compressed data object according to a second compression method, the second compression method having a lower compression speed performance and a higher compression ratio than the first compression method, storing the second compressed data object in the swap data storage area, and reclaiming a portion of the swap data storage area in which the first compressed data object was stored.

* * * * *